US012809830B2

(12) United States Patent
Kanmani et al.

(10) Patent No.: US 12,809,830 B2
(45) Date of Patent: Nov. 24, 2026

(54) AI-BASED CONVERSION OF A NATURAL LANGUAGE PROMPT TO A SYSTEM-SPECIFIC SEGMENT DEFINITION USING ENTITY REDUCTION AND RENAMING

(71) Applicant: Microsoft Technology Licensing, LLC, Redmond, WA (US)

(72) Inventors: Karthic Kanmani, Bothell, WA (US); Vineet Bindal, San Jose, CA (US); Scott Michael Lane, Mill Creek, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 341 days.

(21) Appl. No.: 18/410,850

(22) Filed: Jan. 11, 2024

(65) Prior Publication Data

US 2025/0190406 A1 Jun. 12, 2025

Related U.S. Application Data

(60) Provisional application No. 63/607,081, filed on Dec. 6, 2023.

(51) Int. Cl.

| | |
|---|---|
| ***G06F 40/295*** | (2020.01) |
| ***G06F 16/21*** | (2019.01) |
| ***G06F 40/40*** | (2020.01) |

(52) U.S. Cl.

CPC .......... *G06F 16/213* (2019.01); *G06F 40/295* (2020.01); *G06F 40/40* (2020.01)

(58) Field of Classification Search

CPC ....... G06F 16/213; G06F 40/40; G06F 40/295

See application file for complete search history.

(56) References Cited

U.S. PATENT DOCUMENTS 12,488,184 B1 * 12/2025 Sun ....................... G06F 40/284
2016/0283525 A1 * 9/2016 Farenden ................ G06F 16/18

(Continued)

OTHER PUBLICATIONS

Fernandez, et al., “Core Building Blocks: Next Gen Geo Spatial GPT Application”, arxiv.org, Cornell University Library, 201 Olin Library Cornell University Ithaca, NY 14853, Oct. 17, 2023, pp. 1-12.

(Continued)

*Primary Examiner* — Richemond Dorvil
*Assistant Examiner* — Ethan Daniel Kim

(57) ABSTRACT

Techniques are described herein that are capable of performing AI-based conversion of a natural language prompt (“prompt”) to a system-specific segment definition using entity reduction and renaming. The prompt requests data that satisfies a search criterion from a database that stores entities having entity names. Each entity name not satisfying a relevance criterion is changed based on content of the respective entity. An AI model is caused to determine a first subset of the entity names that is relevant to the prompt by providing a first AI prompt, the prompt, and the entity names as first inputs to the AI model. The AI model is caused to convert the prompt to the system-specific segment definition, which conforms to a particular format, by providing a second AI prompt, the prompt, information regarding the particular format, and the first subset of the entity names as second inputs to the AI model.

20 Claims, 8 Drawing Sheets

(56) References Cited

U.S. PATENT DOCUMENTS

| | | | | |
|---|---|---|---|---|
| 2022/0050866 | A1* | 2/2022 | Bonfield | G06F 16/433 |
| 2023/0359826 | A1* | 11/2023 | Sha | G06F 40/295 |

OTHER PUBLICATIONS

International Search Report and Written Opinion received for PCT Application No. PCT/US2024/055412, mailed on Feb. 5, 2025, 16 pages.

Rahimi, et al., "Exploring the Effectiveness of GPT Models in Test-Taking: A Case Study of the Driver's License Knowledge Test", arxiv.org, Cornell University Library, 201 Olin Library Cornell University Ithaca, NY 14853, Aug. 22, 2023, pp. 1-9.

International Preliminary Report on Patentability (Chapter I) received for PCT Application No. PCT/US2024/055412, mailed on Jun. 18, 2026, 10 pages.

* cited by examiner

AI-BASED CONVERSION OF A NATURAL LANGUAGE PROMPT TO A SYSTEM-SPECIFIC SEGMENT DEFINITION USING ENTITY REDUCTION AND RENAMING

CROSS-REFERENCE TO RELATED APPLICATION(S)

This application claims the benefit of U.S. Provisional Application No. 63/607,081, filed Dec. 6, 2023 and entitled "AI-Based Conversion of a Natural Language Prompt to a System-Specific Segment Definition Using Entity Reduction and Renaming," the entirety of which is incorporated herein by reference.

BACKGROUND

Data segmentation involves grouping data from a dataset into multiple subsets (i.e., data segments) based on one or more factors. In the realm of Natural Language Processing (NLP) systems, defining data segments in relatively large datasets that include multiple entities poses significant challenges, especially for Customer Data Platform (CDP) systems such as a Dynamics 365® Customer Insights™ (CI) system. For instance, such systems often require comprehensive metadata (e.g., schema and attribute names) associated with the entities for accurate generation of segment definitions.

Artificial intelligence (AI) models, such as GPT-3.5 and its successors, may be used to generate segment definitions. However, the AI models typically are constrained by multiple factors, such as a maximum token limit and inaccurate descriptions of metadata. A maximum token limit of an AI model represents a maximum amount of data that the AI model is capable of processing with regard to an AI prompt. These factors limit the total volume of data and the type of data that can be processed accurately and at the same time.

Accordingly, when processing a large dataset with numerous entities, providing complete schema information for all entities to the AI model becomes infeasible due to the maximum token limit. This constraint limits the AI model's understanding of the available entities, which can reduce the accuracy of segment definitions generated by the AI model.

SUMMARY

It may be desirable to use an artificial intelligence (AI) model to convert a natural language prompt into a system-specific segment definition, for example, to enable generation of a more accurate, precise, and/or reliable response to the natural language query. An AI model is a model that utilizes artificial intelligence to generate an answer that is responsive to an AI prompt (a.k.a. prompt) that is received by the AI model. The AI model may be an artificial general intelligence model. An artificial general intelligence model is an AI model (e.g., an autonomous AI model) that is configured to be capable of performing any task that an animal (e.g., a human) is capable of performing. In an example implementation, the artificial general intelligence model is capable of performing a task that surpasses the capabilities of an animal.

Artificial intelligence is intelligence of a machine (e.g., a processing system) and/or code (e.g., software and/or firmware), as opposed to intelligence of an animal (e.g., a human). An AI prompt indicates (e.g., specifies) a task that is to be performed by an AI model. In an aspect, the AI prompt is written in a natural language. Examples of an AI prompt include but are not limited to a zero-shot prompt, a one-shot prompt, and a few-shot prompt. A zero-shot prompt is a prompt for which the prompt and/or its corresponding contextual information, which are to be processed by the AI model, is not included in pre-trained knowledge of the AI model. A one-shot prompt is a prompt that includes a target prompt along with a single example prompt and a single example answer that is responsive to the single example prompt. The example prompt and the example answer provide guidance as to how the AI model is expected to respond to the target prompt. A few-shot prompt is a prompt that includes a target prompt along with multiple example prompts and multiple example answers that are responsive to the respective example prompts. The example prompts and the example answers provide guidance as to how the AI model is expected to respond to the target prompt.

A natural language prompt is a prompt that is written in a natural language. A natural language is a human language that has developed through use and repetition. For instance, the natural language may have developed naturally without conscious planning or premeditation. Examples of a natural language include English, French, Spanish, and Mandarin. A system-specific segment definition is a segment definition that is specific to a system (e.g., a Customer Data Platform (CDP) system). A data segment definition is information that defines a data segment. For instance, the data segment definition may specify one or more criteria that are to be satisfied by data that is included in the data segment. A data segment is a subset of a dataset that satisfies one or more criteria, which are defined by a data segment definition. The dataset may be stored in a database. Each data segment includes one or more entities. Examples of an entity include a table and a column of a table.

It may be desirable to reduce a number of entities that are taken into consideration by an AI model when using the AI model to convert a natural language prompt into a system-specific segment definition. In an aspect, the AI model reduces the number of entities that are considered by determining a relevant subset of the entities, which is relevant to the natural language prompt, and then focusing on the relevant subset to convert the natural language prompt into the system-specific segment definition. For example, the AI model may take into consideration the entities in the relevant subset and not take into consideration the other entities. The amount of information associated with the entities in the relevant subset is less than (e.g., substantially less than) the amount of information associated with all of the entities in the database. Accordingly, by considering only those entities that are relevant to the natural language prompt, the size of the information taken into consideration by the AI model to covert the natural language prompt into the system-specific segment definition may not reach a maximum token limit of the AI model. Because the size of the information does not reach the maximum token limit of the AI model, accuracy of the system-specific segment definition generated using the AI model may be relatively high as compared to a segment definition generated using conventional techniques.

Prior to reducing the number of entities that are taken into consideration by the AI model, entities having names that do not sufficiently correspond to content of those entities may be renamed to correspond to the content more accurately. Renaming entities to correspond to their content more accurately may enable the AI model to determine the relevant subset of the entities more accurately, which is relevant to the natural language prompt.

Various approaches are described herein for, among other things, performing AI-based conversion of a natural language prompt to a system-specific segment definition using entity reduction and renaming. For instance, the approaches are capable of renaming entities to correspond to content of the entities more accurately and then identifying entity names that are relevant to the natural language prompt for use in converting the natural language prompt to the system-specific segment definition. In an example approach, a natural language prompt is received. The natural language prompt requests data that satisfies a search criterion from a database that stores entities. Relevance scores are assigned to entity names of the entities. Each relevance score indicates an extent to which a respective entity name corresponds to content of a respective entity. Entity name representations are defined to represent the entities by performing a first operation and a second operation. In the first operation, for each entity having an entity name that is assigned a relevance score that is less than a relevance threshold, the entity name representation of the respective entity is defined to be a respective replacement name, which is based at least on the content of the respective entity, rather than the entity name of the respective entity. In the second operation, for each entity having an entity name that is assigned a relevance score that is greater than or equal to the relevance threshold, the entity name representation of the respective entity is defined to be the respective entity name. A first AI prompt is generated. The first AI prompt requests an indication of which of the entity name representations is relevant to the natural language prompt. An AI model is caused to determine a first subset of the entity name representations that is relevant to the natural language prompt and a second subset of the entity name representations that is not relevant to the natural language prompt by providing the first AI prompt together with first contextual information as first inputs to the AI model. The first contextual information includes the natural language prompt and the entity name representations. The natural language prompt and the entity name representations include context regarding the first AI prompt. A second AI prompt is generated. The second AI prompt requests conversion of the natural language prompt to a system-specific segment definition that conforms to a system-specific segment definition format that is specific to a customer data platform system. Based at least on receipt of a response to the first AI prompt from the AI model that indicates the first and second subsets of the entity name representations, the AI model is caused to convert the natural language prompt to the system-specific segment definition by providing the second AI prompt together with second contextual information as second inputs to the AI model. The second contextual information includes the natural language prompt, information regarding the system-specific segment definition format, and the first subset of the entity name representations. The second contextual information does not include the second subset of the entity name representations. The natural language prompt, the information regarding the system-specific segment definition format, and the first subset of the entity name representations include context regarding the second AI prompt.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

Figure 1:
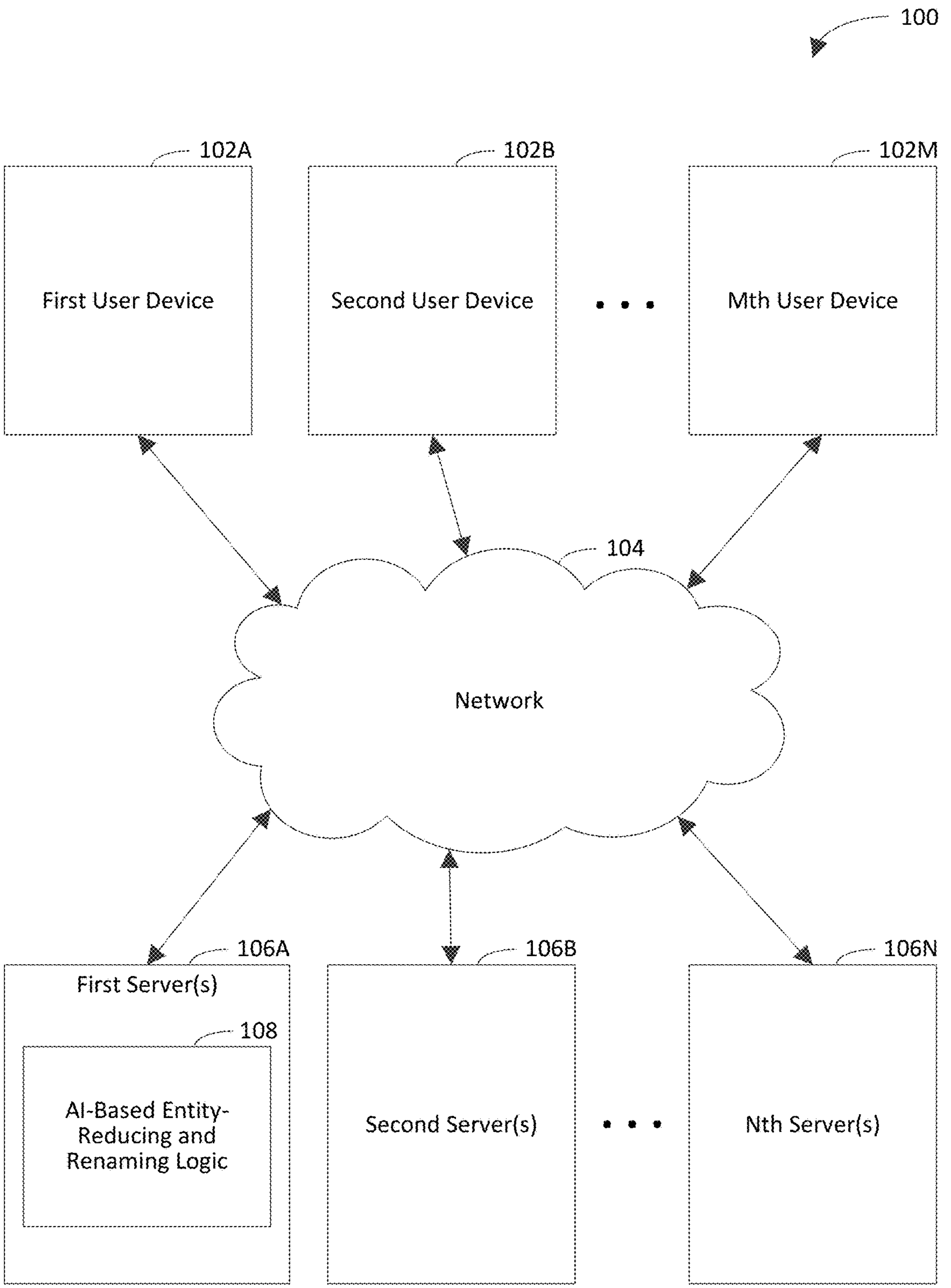
FIG. 1 is a block diagram of an example AI-based entity-reducing and renaming system in accordance with an embodiment.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Example Embodiments

It may be desirable to use an artificial intelligence (AI) model to convert a natural language prompt into a system-specific segment definition, for example, to enable generation of a more accurate, precise, and/or reliable response to the natural language query. An AI model is a model that utilizes artificial intelligence to generate an answer that is responsive to an AI prompt (a.k.a. prompt) that is received by the AI model. The AI model may be an artificial general intelligence model. An artificial general intelligence model is an AI model (e.g., an autonomous AI model) that is configured to be capable of performing any task that an animal (e.g., a human) is capable of performing. In an example implementation, the artificial general intelligence model is capable of performing a task that surpasses the capabilities of an animal.

Artificial intelligence is intelligence of a machine (e.g., a processing system) and/or code (e.g., software and/or firmware), as opposed to intelligence of an animal (e.g., a human). An AI prompt indicates (e.g., specifies) a task that is to be performed by an AI model. In an aspect, the AI prompt is written in a natural language. Examples of an AI prompt include but are not limited to a zero-shot prompt, a one-shot prompt, and a few-shot prompt. A zero-shot prompt is a prompt for which the prompt and/or its corresponding contextual information, which are to be processed by the AI model, is not included in pre-trained knowledge of the AI model. A one-shot prompt is a prompt that includes a target prompt along with a single example prompt and a single example answer that is responsive to the single example prompt. The example prompt and the example answer provide guidance as to how the AI model is expected to respond to the target prompt. A few-shot prompt is a prompt that includes a target prompt along with multiple example prompts and multiple example answers that are responsive to the respective example prompts. The example prompts and the example answers provide guidance as to how the AI model is expected to respond to the target prompt.

A natural language prompt is a prompt that is written in a natural language. A natural language is a human language that has developed through use and repetition. For instance, the natural language may have developed naturally without conscious planning or premeditation. Examples of a natural language include English, French, Spanish, and Mandarin. A system-specific segment definition is a segment definition that is specific to a system (e.g., a Customer Data Platform (CDP) system). A data segment definition is information that defines a data segment. For instance, the data segment definition may specify one or more criteria that are to be satisfied by data that is included in the data segment. A data segment is a subset of a dataset that satisfies one or more criteria, which are defined by a data segment definition. The dataset may be stored in a database. Each data segment includes one or more entities. Examples of an entity include a table and a column of a table.

It may be desirable to reduce a number of entities that are taken into consideration by an AI model when using the AI model to convert a natural language prompt into a system-specific segment definition. In an aspect, the AI model reduces the number of entities that are considered by determining a relevant subset of the entities, which is relevant to the natural language prompt, and then focusing on the relevant subset to convert the natural language prompt into the system-specific segment definition. For example, the AI model may take into consideration the entities in the relevant subset and not take into consideration the other entities. The amount of information associated with the entities in the relevant subset is less than (e.g., substantially less than) the amount of information associated with all of the entities in the database. Accordingly, by considering only those entities that are relevant to the natural language prompt, the size of the information taken into consideration by the AI model to covert the natural language prompt into the system-specific segment definition may not reach a maximum token limit of the AI model. Because the size of the information does not reach the maximum token limit of the AI model, accuracy of the system-specific segment definition generated using the AI model may be relatively high as compared to a segment definition generated using conventional techniques.

Prior to reducing the number of entities that are taken into consideration by the AI model, entities having names that do not sufficiently correspond to content of those entities may be renamed to correspond to the content more accurately. Renaming entities to correspond to their content more accurately may enable the AI model to determine the relevant subset of the entities more accurately, which is relevant to the natural language prompt.

Example embodiments described herein are capable of performing AI-based conversion of a natural language prompt to a system-specific segment definition using entity reduction and renaming. For instance, the example embodiments are capable of renaming entities to correspond to content of the entities more accurately and then identifying entity names that are relevant to the natural language prompt for use in converting the natural language prompt to the system-specific segment definition. In an example implementation, a natural language prompt is received. The natural language prompt requests data that satisfies a search criterion from a database that stores entities. Relevance scores are assigned to entity names of the entities. Each relevance score indicates an extent to which a respective entity name corresponds to content of a respective entity. Entity name representations are defined to represent the entities by performing a first operation and a second operation. In the first operation, for each entity having an entity name that is assigned a relevance score that is less than a relevance threshold, the entity name representation of the respective entity is defined to be a respective replacement name, which is based at least on the content of the respective entity, rather than the entity name of the respective entity. In the second operation, for each entity having an entity name that is assigned a relevance score that is greater than or equal to the relevance threshold, the entity name representation of the respective entity is defined to be the respective entity name. A first AI prompt is generated. The first AI prompt requests an indication of which of the entity name representations is relevant to the natural language prompt. An AI model is caused to determine a first subset of the entity name representations that is relevant to the natural language prompt and a second subset of the entity name representations that is not relevant to the natural language prompt by providing the first AI prompt together with first contextual information as first inputs to the AI model. The first contextual information includes the natural language prompt and the entity name representations. The natural language prompt and the entity name representations include context regarding the first AI prompt. A second AI prompt is generated. The second AI prompt requests conversion of the natural language prompt to a system-specific segment definition that conforms to a system-specific segment definition format that is specific to a customer data platform system. Based at least on (e.g., in response to or as a result of) receipt of a response to the first AI prompt from the AI model that indicates the first and second subsets of the entity name representations, the AI model is caused to convert the natural language prompt to the system-specific segment definition by providing the second AI prompt together with second contextual information as second inputs to the AI model. The second contextual information includes the natural language prompt, information regarding the system-specific segment definition format, and the first subset of the entity name representations. The second contextual information does not include the second subset of the entity name representations. The natural language prompt, the information regarding the system-specific segment definition format, and the first subset of the entity name representations include context regarding the second AI prompt.

Example techniques described herein have a variety of benefits as compared to conventional techniques for converting a natural language prompt into a segment definition.

For instance, the example techniques are capable of renaming entities that are included in a database (and attributes of those entities) to represent content of the entities more accurately. Accordingly, the example techniques may be capable of handling entities and attributes that do not have inherently meaningful names, resulting in greater versatility and comprehensiveness. The example techniques are capable of focusing on a relevant subset of the entities, which is relevant to the natural language prompt, to increase accuracy, precision, and/or reliability of the segment definition. For instance, the example techniques are capable of reducing a number of entities that are taken into consideration by an AI model when using the AI model to convert the natural language prompt into a system-specific segment definition. In an aspect, the AI model takes into consideration the entities that are included in the relevant subset and does not take into consideration the entities that are not included in the relevant subset to convert the natural language prompt. By taking into consideration the entities in the relevant subset and not the other entities, the example techniques may enable the AI model to use an entirety of the information regarding the entities that are included in the relevant subset to generate the system-specific segment definition without reaching the maximum token limit of the AI model. By using the entirety of the information regarding the entities that are included in the relevant subset, the example techniques may enable the AI model to generate a system-specific segment definition that, when executed against the database, provides a more accurate, precise, and/or reliable result. The example techniques may be implemented as a standalone, robust, and scalable feature that does not require substantial preprocessing of data or significant modifications to the AI model.

The example techniques may reduce an amount of time and/or resources (e.g., processor cycles, memory, network bandwidth) that is consumed to convert a natural language prompt into a system-specific segment definition. For example, reducing a number of entities that are taken into consideration by an AI model when using the AI model to convert the natural language prompt into the system-specific segment definition may reduce the amount of time and/or resources that is consumed by a computing system on which the AI model runs to perform the conversion. In accordance with this example, reducing the number of entities that are taken into consideration by the AI model reduces an amount of time and/or resources that would have otherwise been consumed by the computing system to take into consideration the other entities (i.e., the non-relevant entities) when performing the conversion. By reducing the amount of time and/or resources that is consumed, the efficiency of the computing system may be increased.

The example techniques may increase a user experience of a user who initiates the natural language prompt. For instance, the example techniques may increase accuracy, precision, and/or reliability of data that is received as a response to the natural language query. The example techniques may automate operations that otherwise would be performed by the user, which may reduce an amount of time consumed and/or effort expended by the user to determine a system-specific segment definition that corresponds to the natural language prompt. The example techniques may increase an efficiency of the user by reducing the amount of time that the user otherwise would have consumed to generate the system-specific segment definition.

FIG. 1 is a block diagram of an example AI-based entity-reducing and renaming system 100 in accordance with an embodiment. Generally speaking, the AI-based entity-reducing and renaming system 100 operates to provide information to users in response to requests (e.g., hypertext transfer protocol (HTTP) requests) that are received from the users. The information may include documents (Web pages, images, audio files, video files, etc.), output of executables, and/or any other suitable type of information. In accordance with example embodiments described herein, the AI-based entity-reducing and renaming system 100 performs AI-based conversion of a natural language prompt to a system-specific segment definition using entity reduction and renaming. Detail regarding techniques for performing AI-based conversion of a natural language prompt to a system-specific segment definition using entity reduction and renaming is provided in the following discussion.

As shown in FIG. 1, the AI-based entity-reducing and renaming system 100 includes a plurality of user devices 102A-102M, a network 104, and a plurality of servers 106A-106N. Communication among the user devices 102A-102M and the servers 106A-106N is carried out over the network 104 using well-known network communication protocols. The network 104 may be a wide-area network (e.g., the Internet), a local area network (LAN), another type of network, or a combination thereof.

The user devices 102A-102M are computing systems that are capable of communicating with servers 106A-106N. A computing system is a system that includes at least a portion of a processor system such that the portion of the processor system includes at least one processor that is capable of manipulating data in accordance with a set of instructions. A processor system includes one or more processors, which may be on a same (e.g., single) device or distributed among multiple (e.g., separate) devices. For instance, a computing system may be a computer, a personal digital assistant, etc. The user devices 102A-102M are configured to provide requests to the servers 106A-106N for requesting information stored on (or otherwise accessible via) the servers 106A-106N. For instance, a user may initiate a request for executing a computer program (e.g., an application) using a client (e.g., a Web browser, Web crawler, or other type of client) deployed on a user device 102 that is owned by or otherwise accessible to the user. In accordance with some example embodiments, the user devices 102A-102M are capable of accessing domains (e.g., Web sites) hosted by the servers 104A-104N, so that the user devices 102A-102M may access information that is available via the domains. Such domain may include Web pages, which may be provided as hypertext markup language (HTML) documents and objects (e.g., files) that are linked therein, for example.

Each of the user devices 102A-102M may include any client-enabled system or device, including but not limited to a desktop computer, a laptop computer, a tablet computer, a wearable computer such as a smart watch or a head-mounted computer, a personal digital assistant, a cellular telephone, an Internet of things (IoT) device, or the like. It will be recognized that any one or more of the user devices 102A-102M may communicate with any one or more of the servers 106A-106N.

The servers 106A-106N are computing systems that are capable of communicating with the user devices 102A-102M. The servers 106A-106N are configured to execute computer programs that provide information to users in response to receiving requests from the users. For example, the information may include documents (Web pages, images, audio files, video files, etc.), output of executables, or any other suitable type of information. In accordance with some example embodiments, the servers 106A-106N are configured to host respective Web sites, so that the Web sites are accessible to users of the complex expression-based metadata generation system 100.

One example type of computer program that may be executed by one or more of the servers 106A-106N is a customer data platform (CDP). A CDP is a computer program that creates a persistent, unified customer database that is accessible to external systems. The customer database may standardize customer data that is received from a variety of on-line and off-line sources to create a comprehensive profile of a customer. The customer data may include demographic data, which includes demographic data regarding the customer, and/or activity data, which indicates activities performed by the customer. Examples of a CDP include a Dynamics 365® Customer Insights™ (CI) service, developed by Microsoft Corporation; a Segment® service, developed and distributed by Twilio Inc.; an Emarsys® service, developed and distributed by Emarsys eMarketing Systems GMBH; an Optimove® service, developed and distributed by Optimove Inc. (formerly Mobius Solutions Ltd.); and a FirstHive® service, developed and distributed by FirstHive Tech Corporation. It will be recognized that the example techniques described herein may be implemented using a CDP.

A CDP may be implemented as a cloud computing program (a.k.a. a cloud service). A cloud computing program is a computer program that provides hosted service(s) via a network (e.g., network 104). For instance, the hosted service(s) may be hosted by any one or more of the servers 106A-106N. The cloud computing program may enable users (e.g., at any of the user systems 102A-102M) to access shared resources that are stored on or are otherwise accessible to the server(s) via the network.

The cloud computing program may provide hosted service(s) according to any of a variety of service models, including but not limited to Backend as a Service (BaaS), Software as a Service (SaaS), Platform as a Service (PaaS), and Infrastructure as a Service (IaaS). BaaS enables applications (e.g., software programs) to use a BaaS provider's backend services (e.g., push notifications, integration with social networks, and cloud storage) running on a cloud infrastructure. SaaS enables a user to use a SaaS provider's applications running on a cloud infrastructure. PaaS enables a user to develop and run applications using a PaaS provider's application development environment (e.g., operating system, programming-language execution environment, database) on a cloud infrastructure. IaaS enables a user to use an IaaS provider's computer infrastructure (e.g., to support an enterprise). For example, IaaS may provide to the user virtualized computing resources that utilize the IaaS provider's physical computer resources.

It will be recognized that the example techniques described herein may be implemented using a cloud computing program. For instance, a software product (e.g., a subscription service, a non-subscription service, or a combination thereof) may include the cloud computing program, and the software product may be configured to perform the example techniques, though the scope of the example embodiments is not limited in this respect.

The first server(s) 106A are shown to include AI-based entity-reducing and renaming logic 108 for illustrative purposes. The AI-based entity-reducing and renaming logic 108 is configured to perform AI-based conversion of a natural language prompt to a system-specific segment definition using entity reduction and renaming. In an example implementation, the AI-based entity-reducing and renaming logic 108 receives a natural language prompt. The natural language prompt requests data that satisfies a search criterion from a database that stores entities. The AI-based entity-reducing and renaming logic 108 assigns relevance scores to entity names of the entities. Each relevance score indicates an extent to which a respective entity name corresponds to content of a respective entity. The AI-based entity-reducing and renaming logic 108 defines entity name representations to represent the entities by performing a first operation and a second operation. In the first operation, for each entity having an entity name that is assigned a relevance score that is less than a relevance threshold, the AI-based entity-reducing and renaming logic 108 defines the entity name representation of the respective entity to be a respective replacement name, which is based at least on the content of the respective entity, rather than the entity name of the respective entity. In the second operation, for each entity having an entity name that is assigned a relevance score that is greater than or equal to the relevance threshold, the AI-based entity-reducing and renaming logic 108 defines the entity name representation of the respective entity to be the respective entity name. The AI-based entity-reducing and renaming logic 108 generates a first AI prompt, prompt requests an indication of which of the entity name representations is relevant to the natural language prompt. The AI-based entity-reducing and renaming logic 108 causes an AI model to determine a first subset of the entity name representations that is relevant to the natural language prompt and a second subset of the entity name representations that is not relevant to the natural language prompt by providing the first AI prompt together with first contextual information as first inputs to the AI model. The first contextual information includes the natural language prompt and the entity name representations. The natural language prompt and the entity name representations include context regarding the first AI prompt. The AI-based entity-reducing and renaming logic 108 generates a second AI prompt, which requests conversion of the natural language prompt to a system-specific segment definition that conforms to a system-specific segment definition format that is specific to a customer data platform system. Based at least on receipt of a response to the first AI prompt from the AI model that indicates the first and second subsets of the entity name representations, the AI-based entity-reducing and renaming logic 108 causes the AI model to convert the natural language prompt to the system-specific segment definition by providing the second AI prompt together with second contextual information as second inputs to the AI model. The second contextual information includes the natural language prompt, information regarding the system-specific segment definition format, and the first subset of the entity name representations. The second contextual information does not include the second subset of the entity name representations. The natural language prompt, the information regarding the system-specific segment definition format, and the first subset of the entity name representations include context regarding the second AI prompt.

The AI-based entity-reducing and renaming logic 108 may be implemented in various ways to perform AI-based conversion of a natural language prompt to a system-specific segment definition using entity reduction and renaming, including being implemented in hardware, software, firmware, or any combination thereof. For example, the AI-based entity-reducing and renaming logic 108 may be implemented as computer program code configured to be executed in one or more processors. In another example, at least a portion of the AI-based entity-reducing and renaming logic 108 may be implemented as hardware logic/electrical circuitry. For instance, at least a portion of the AI-based entity-reducing and renaming logic 108 may be implemented in a field-programmable gate array (FPGA), an application-specific integrated circuit (ASIC), an application-specific standard product (ASSP), a system-on-a-chip system (SoC), a complex programmable logic device (CPLD), etc. Each SoC may include an integrated circuit chip that includes one or more of a processor (a microcontroller, microprocessor, digital signal processor (DSP), etc.), memory, one or more communication interfaces, and/or further circuits and/or embedded firmware to perform its functions.

It will be recognized that the AI-based entity-reducing and renaming logic 108 may be (or may be included in) a CDP and/or a cloud computing program, though the scope of the example embodiments is not limited in this respect.

The AI-based entity-reducing and renaming logic 108 is shown to be incorporated in the first server(s) 106A for illustrative purposes and is not intended to be limiting. It will be recognized that the AI-based entity-reducing and renaming logic 108 (or any portion(s) thereof) may be incorporated in any one or more of the servers 106A-106N, any one or more of the user devices 102A-102M, or any combination thereof. For example, client-side aspects of the AI-based entity-reducing and renaming logic 108 may be incorporated in one or more of the user devices 102A-102M, and server-side aspects of AI-based entity-reducing and renaming logic 108 may be incorporated in one or more of the servers 106A-106N.

Figure 2A:
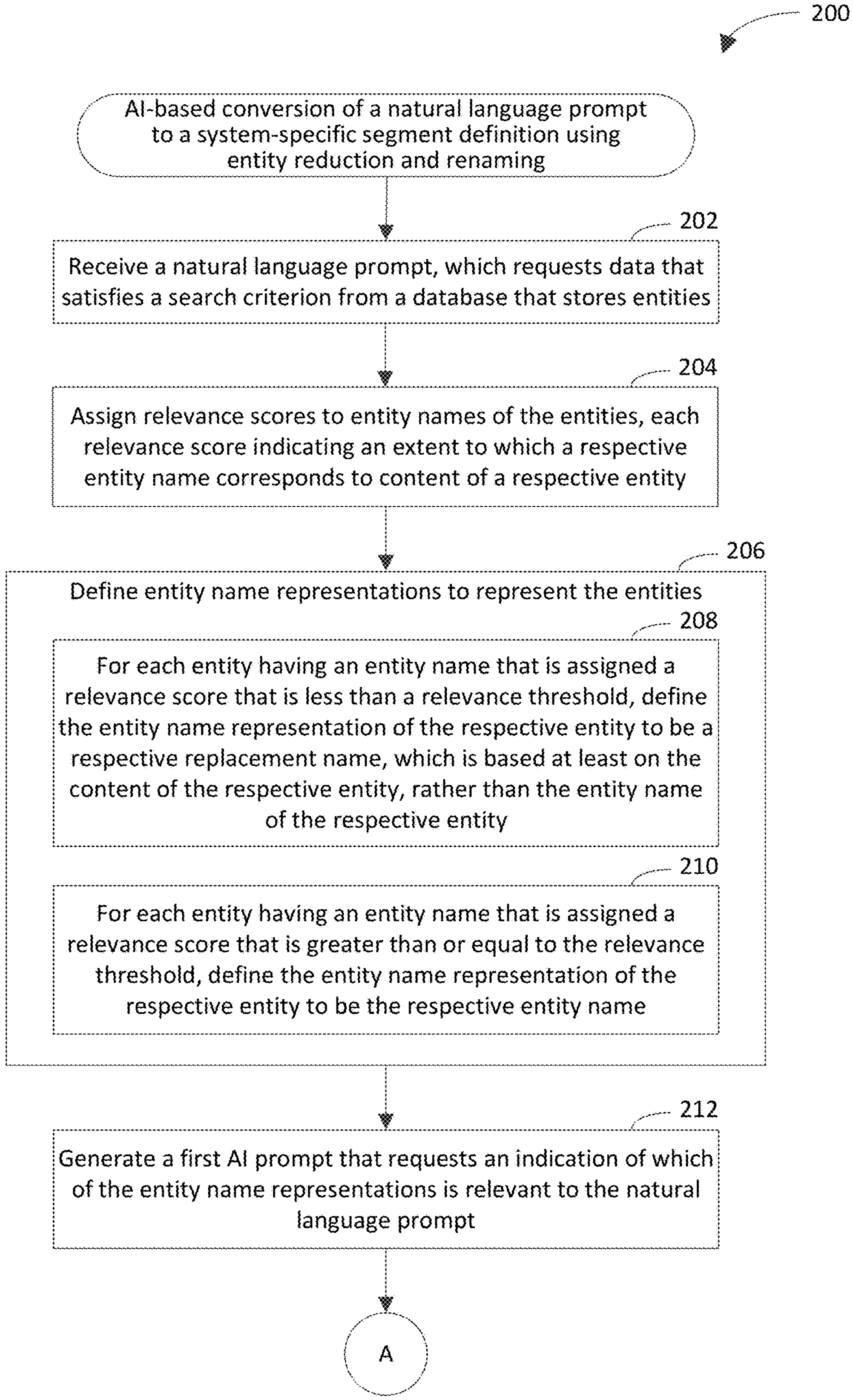
FIGS. 2A-2B depict respective portions of a flowchart of an example method for performing AI-based conversion of a natural language prompt to a system-specific segment definition using entity reduction and renaming in accordance with an embodiment.
Figure 2B:
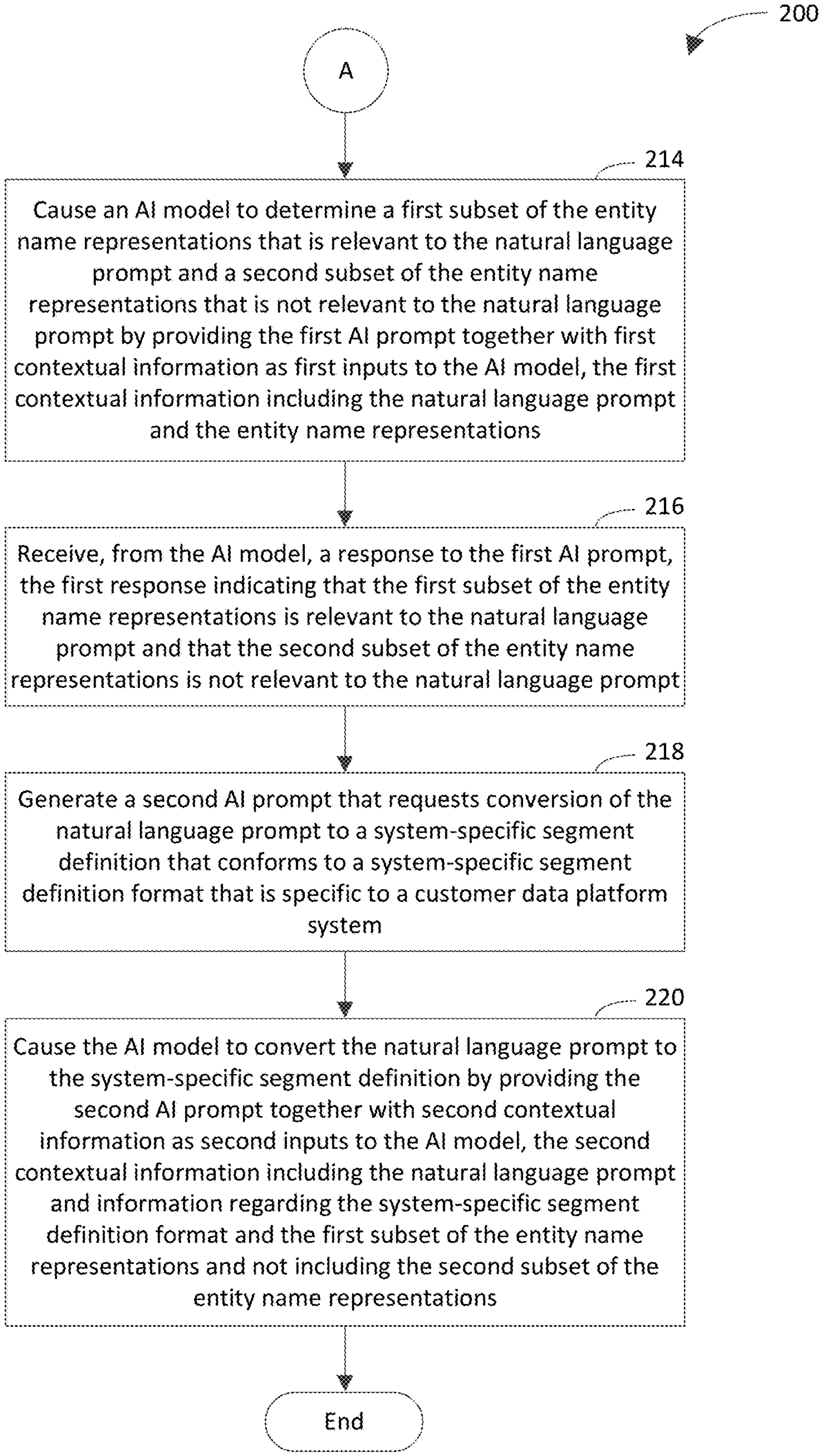
Figure 3:
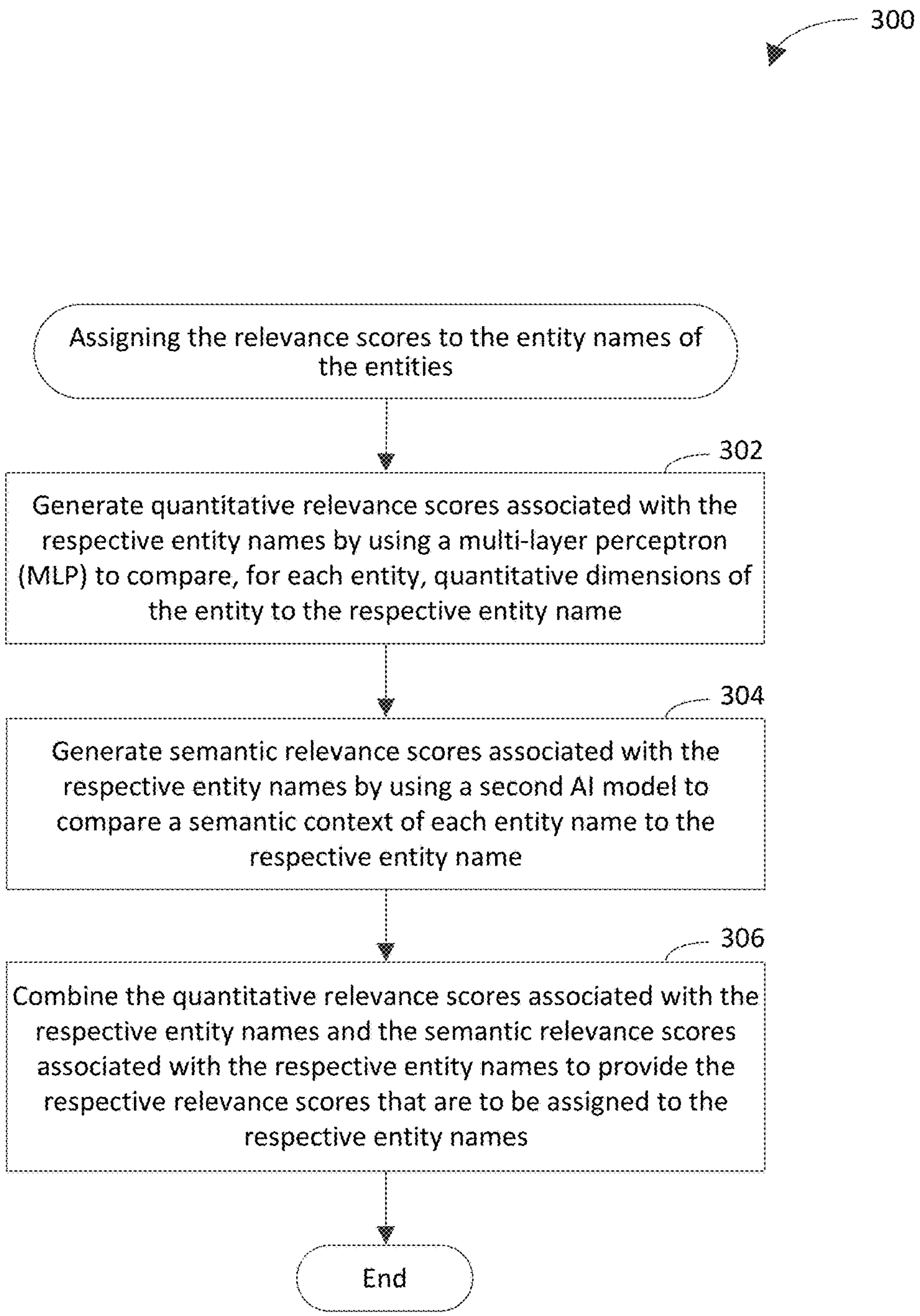
FIG. 3 depicts a flowchart of an example method for assigning relevance scores to entity names of entities in accordance with an embodiment.
Figure 4:
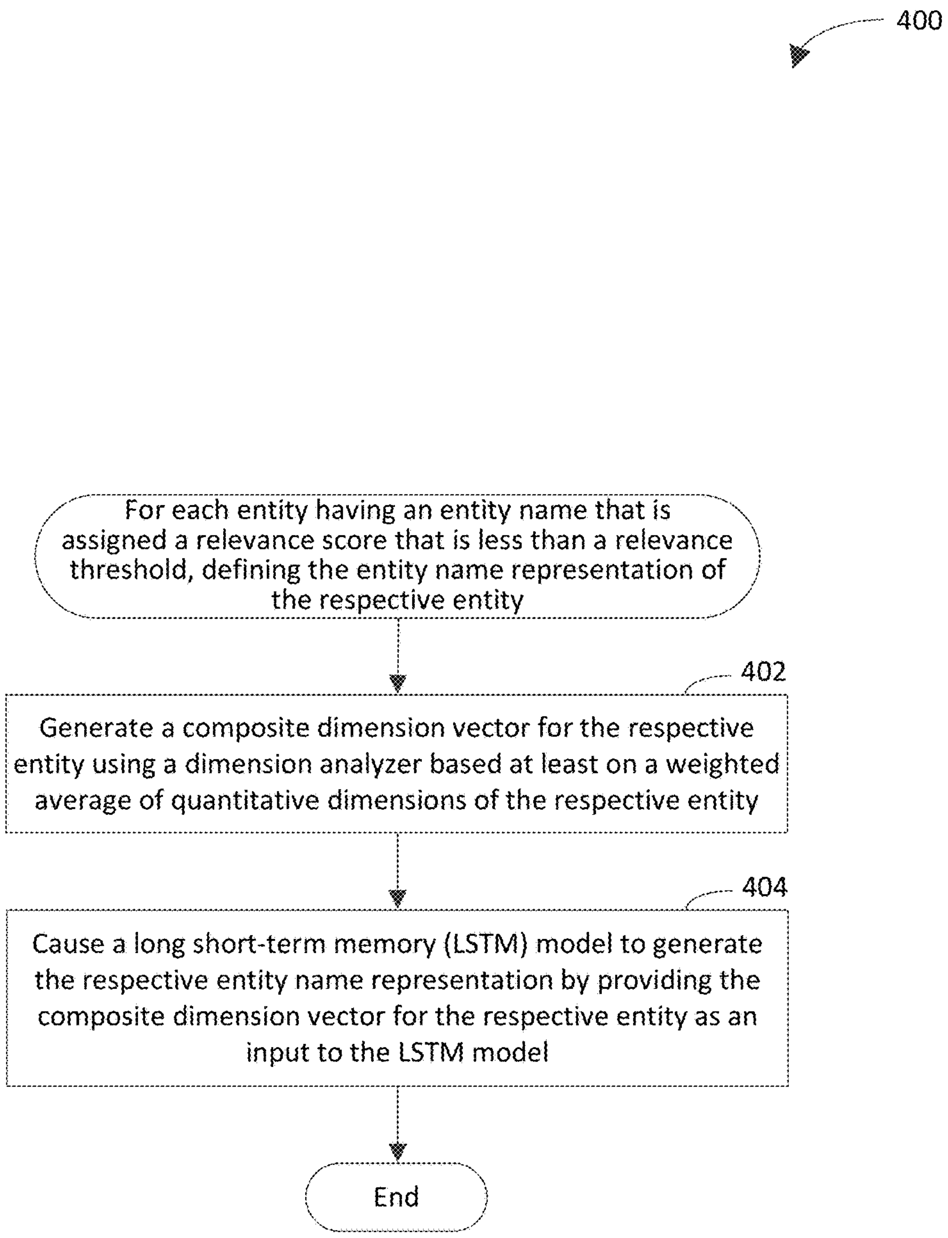
FIG. 4 depicts a flowchart of an example method for defining an entity name representation for each entity having an entity name that is assigned a relevance score that is less than a relevance threshold in accordance with an embodiment.
Figure 5:
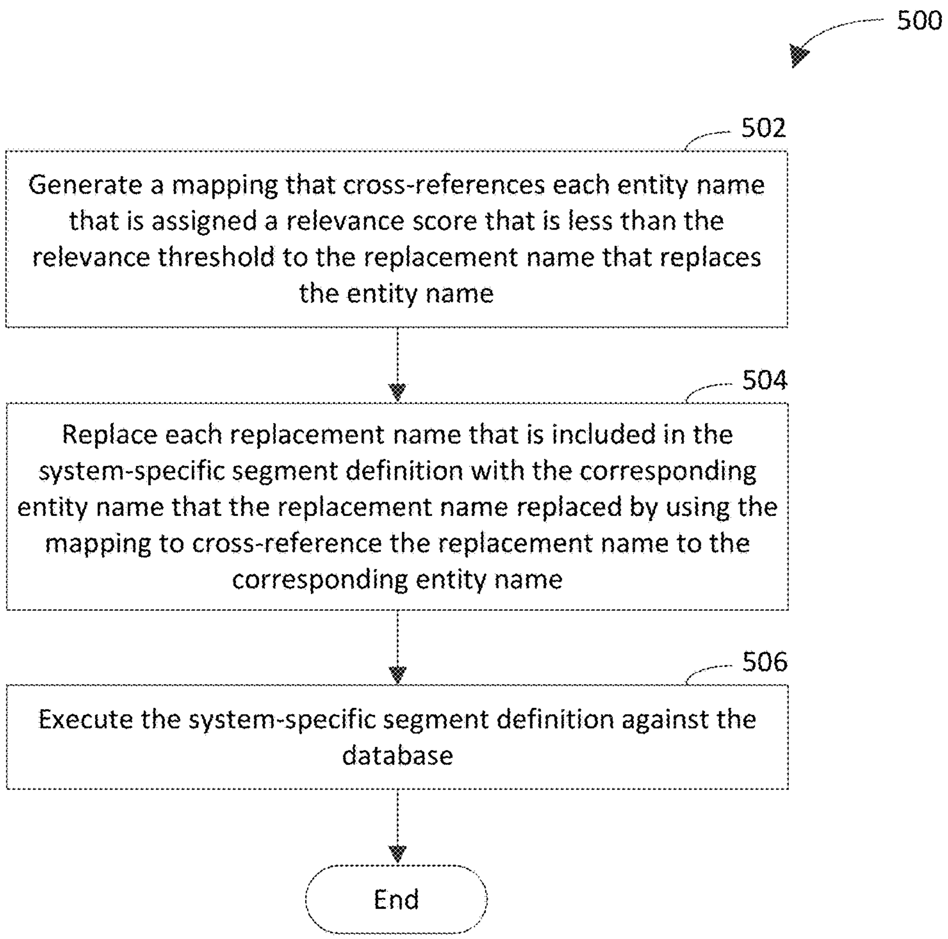
FIGS. 5-6 depict flowcharts of other example methods for performing AI-based conversion of a natural language prompt to a system-specific segment definition using entity reduction and renaming in accordance with embodiments.
Figure 6:
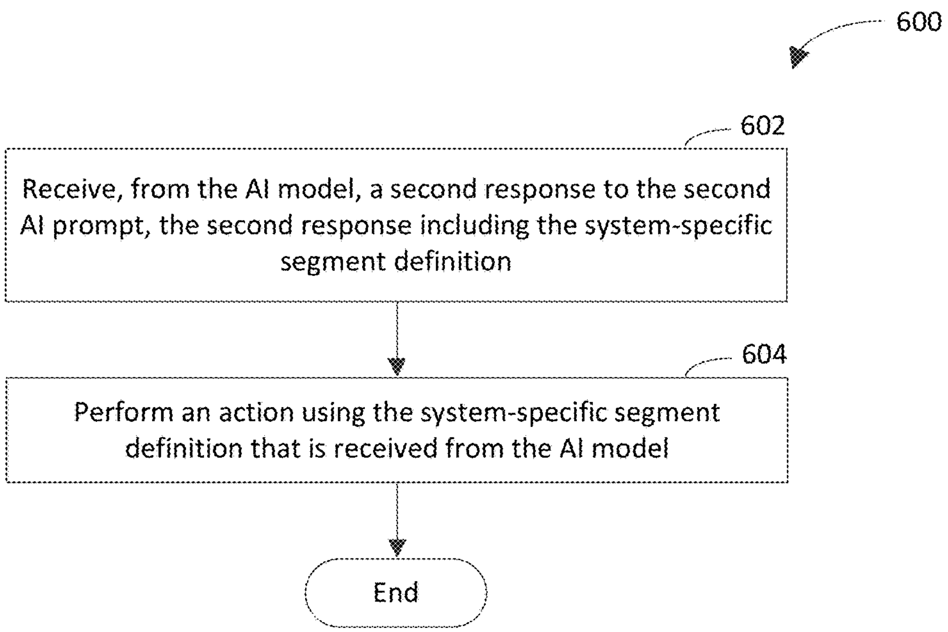
Figure 7:
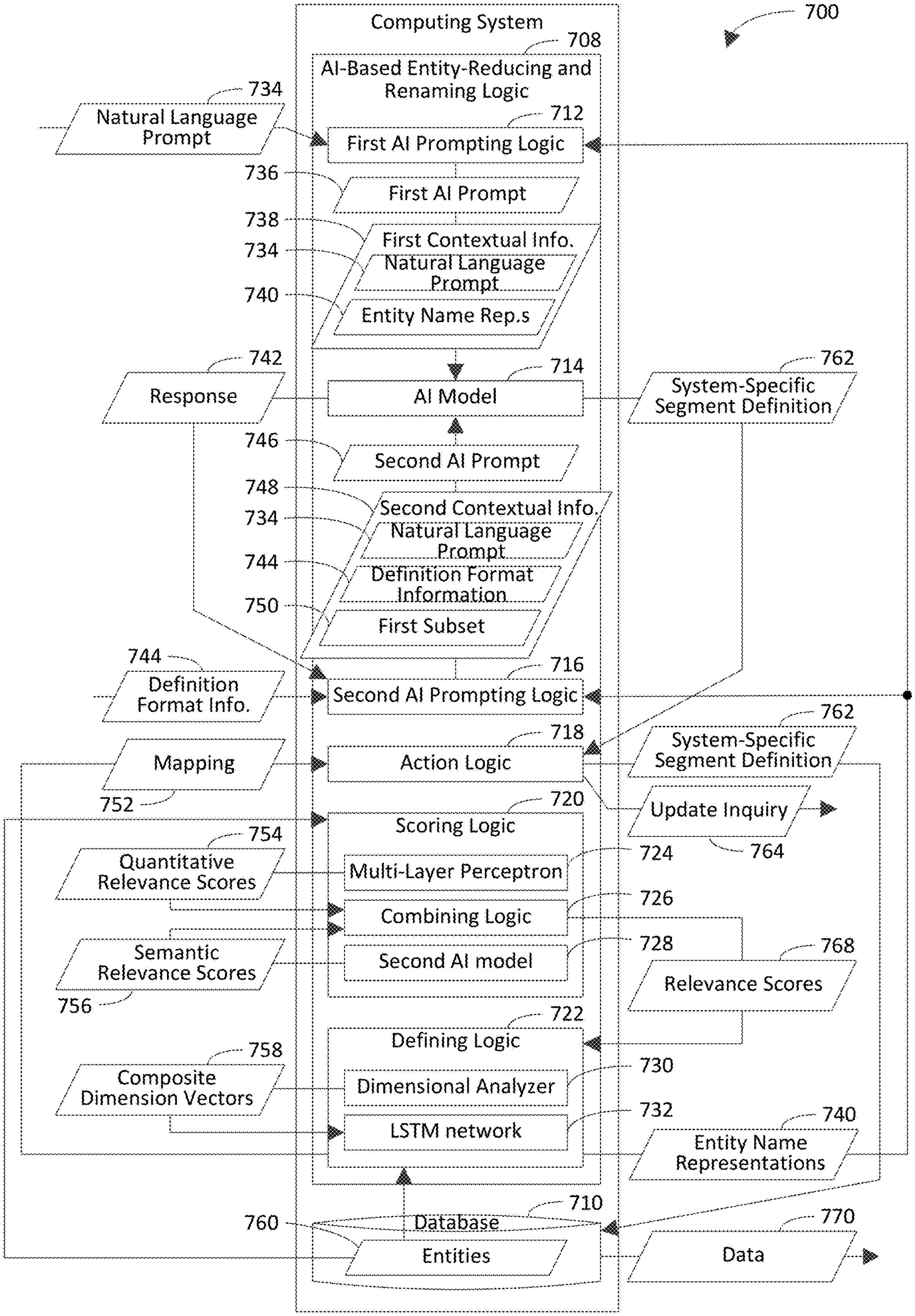
FIG. 7 is a block diagram of an example computing system in accordance with an embodiment.

FIGS. 2A-2B depict respective portions of a flowchart 200 of an example method for performing AI-based conversion of a natural language prompt to a system-specific segment definition using entity reduction and renaming in accordance with an embodiment. FIG. 3 depicts a flowchart 300 of an example method for assigning relevance scores to entity names of entities in accordance with an embodiment. FIG. 4 depicts a flowchart 400 of an example method for defining an entity name representation for each entity having an entity name that is assigned a relevance score that is less than a relevance threshold in accordance with an embodiment. FIGS. 5-6 depict flowcharts 500 and 600 of other example methods for performing AI-based conversion of a natural language prompt to a system-specific segment definition using entity reduction and renaming in accordance with embodiments. Flowcharts 200, 300, 400, 500, and 600 may be performed by the first server(s) 106A shown in FIG. 1, for example. For illustrative purposes, flowcharts 200, 300, 400, 500, and 600 are described with respect to a computing system 700 shown in FIG. 7, which is an example implementation of the first server(s) 106A. As shown in FIG. 7, the computing system 700 includes AI-based entity-reducing and renaming logic 708 and a database 710. The AI-based entity-reducing and renaming logic 708 includes first AI prompting logic 712, an AI model 714, second AI prompting logic 716, action logic 718, scoring logic 720, and defining logic 722. The scoring logic 720 includes a multi-layer perceptron 724, combining logic 726, and a second AI model 728. The defining logic 722 includes a dimensional analyzer 730 and a long short-term memory (LSTM) network 732. The database 710 may be any suitable type of database. For instance, the database 710 may be a relational database, an entity-relationship database, an object database, an object relational database, an extensible markup language (XML) database, etc. The database 710 is shown to store entities 760 for illustrative purposes. Further structural and operational embodiments will be apparent to persons skilled in the relevant art(s) based on the discussion regarding flowcharts 200, 300, 400, 500, and 600.

As shown in FIG. 2, the method of flowchart 200 begins at step 202. In step 202, a natural language prompt, which requests data that satisfies a search criterion from a database that stores entities, is received. In an aspect, the natural language prompt is generated by a user (e.g., a human). In another aspect, the natural language prompt is generated by a computing system (e.g., a CDP that runs on the computing system). In yet another aspect, the natural language prompt defines a portion of a company's customers. For instance, the natural language prompt may be "Male customers 25-40 years old in Seattle." In an example embodiment, the entities include tables. For example, the tables may include demographic information regarding respective users (e.g., customers). In another example, the tables may include activity information regarding the respective users. In another example embodiment, the entities include columns, which are included in one or more tables. In an example implementation, the first AI prompting logic 712 receives a natural language prompt 734, which requests data that satisfies a search criterion from the database 710 that stores the entities 760.

At step 204, relevance scores are assigned to entity names of the entities. Examples of an entity name include "sales orders", "online orders", "in-store orders", "credit card data", "customer data", "loyalty program information", "opened emails", and "customer biography". Each relevance score indicates an extent to which a respective entity name corresponds to content of a respective entity. Each relevance score may be based on other factor(s) in addition to the content of the respective entity. For instance, each relevance score may be further based at least in part on a historical significance of the respective entity and/or relationships between the respective entity and other entities. In an example implementation, the scoring logic 720 assigns relevance scores 768 to entity names of the entities 760. For example, the scoring logic 720 may analyze the entities 760 to determine the entity names of the entities 760. In accordance with this example, the scoring logic 720 may retrieve the entities 760 from the database 710 for analysis based at least on receipt of the natural language prompt 734. Each of the relevance scores 768 indicates an extent to which the respective entity name corresponds to content of the respective entity.

At step 206, entity name representations are defined to represent the entities. In an example implementation, the defining logic 722 defines entity name representations 740, which represent the entities 760.

Step 206 includes step 208 and step 210. At step 206, for each entity having an entity name that is assigned a relevance score that is less than a relevance threshold, the entity name representation of the respective entity is defined to be a respective replacement name, which is based at least on the content of the respective entity, rather than the entity name of the respective entity. For example, an entity having the name "CBD" may include customer biography data. In accordance with this example, the relevance score associated with the name "CBD" may be less than the relevance threshold, and the entity name representation of the entity may be defined to be "customer biography data" based on an analysis of the entity revealing that the content of the entity is customer biography data. The replacement name of the entity in this example is "customer biography data". In an example implementation, for the entities 760 that have entity names with relevance scores that are less than the relevance threshold, the defining logic 722 defines the corresponding entity name representations to be respective replacement names rather than the respective entity names.

At step 210, for each entity having an entity name that is assigned a relevance score that is greater than or equal to the relevance threshold, the entity name representation of the respective entity is defined to be the respective entity name. In an example implementation, for the entities 760 that have entity names with relevance scores that are greater than or equal to the relevance threshold, the defining logic 722 defines the corresponding entity name representations to be the respective entity names.

At step 212, a first AI prompt that requests an indication of which of the entity name representations is relevant to the natural language prompt is generated. In an example implementation, the first AI prompting logic 712 generates a first AI prompt 736 that requests an indication of which of the entity name representations 740 is relevant to the natural language prompt 734. Upon completion of step 212, flow continues to step 214 shown in FIG. 2B.

At step 214, an AI model is caused to determine a first subset of the entity name representations that is relevant to the natural language prompt and a second subset of the entity name representations that is not relevant to the natural language prompt by providing the first AI prompt together with first contextual information as first inputs to the AI model. The first contextual information includes the natural language prompt and the entity name representations. The natural language prompt and the entity name representations include context regarding the first AI prompt. In an aspect, the first contextual information further includes a temperature of the natural language prompt (e.g., to guide the AI model in suggesting the first subset of the entity name representations). A temperature of a natural language prompt indicates an extent of creativity that an answer to the natural language prompt is allowed to include. In another aspect, the first contextual information does not include content of the entities. In an example implementation, the first AI prompting logic 712 causes the AI model 714 to determine a first subset 750 of the entity name representations 740 that is relevant to the natural language prompt 734 and a second subset of the entity name representations 740 that is not relevant to the natural language prompt 734 by providing the first AI prompt 736 together with first contextual information 738 as first inputs to the AI model 714. The first contextual information 738 includes the natural language prompt 734 and the entity name representations 740. The natural language prompt 734 and the entity name representations 740 include context regarding the first AI prompt 734.

In an example embodiment, the first AI prompting logic 712 causes the AI model 714 to analyze (e.g., develop and/or refine an understanding of) the first AI prompt 736, the natural language prompt 734, the entity name representations 740, relationships between any of the foregoing, and confidences in those relationships. For example, the first AI prompting logic 712 may cause the AI model 714 to compare attributes of the first AI prompt 736, the natural language prompt 734, and the entity name representations 740 using artificial intelligence to determine whether a relevance of each of the entity name representations 740 satisfies a relevance criterion.

In some example embodiments, the AI model 714 includes a neural network that uses the artificial intelligence to determine (e.g., predict) relationships between the first AI prompt 736, the natural language prompt 734, and the entity name representations 740 and confidences in the relationships. The neural network uses those relationships to determine whether the relevance of each of the entity name representations 740 satisfies the relevance criterion. For example, attributes of the first AI prompt 736, the natural language prompt 734, and the entity name representations 740 may be compared to determine similarities and differences between those attributes. In accordance with this example, the neural network may use those similarities and differences to determine the first subset 750 of the entity name representations 740 that is relevant to the natural language prompt 734 and the second subset of the entity name representations 740 that is not relevant to the natural language prompt 734.

Examples of a neural network include but are not limited to a feed forward neural network and a transformer-based neural network. A feed forward neural network is an artificial neural network for which connections between units in the neural network do not form a cycle. The feed forward neural network allows data to flow forward (e.g., from the input nodes toward to the output nodes), but the feed forward neural network does not allow data to flow backward (e.g., from the output nodes toward to the input nodes). In an example embodiment, the first AI prompting logic 712 employs a feed forward neural network to train the AI model 714, which is used to determine AI-based confidences. Such AI-based confidences may be used to determine likelihoods that events will occur.

A transformer-based neural network is a neural network that incorporates a transformer. A transformer is a deep learning model that utilizes attention to differentially weight the significance of each portion of sequential input data, such as natural language. Attention is a technique that mimics cognitive attention. Cognitive attention is a behavioral and cognitive process of selectively concentrating on a discrete aspect of information while ignoring other perceivable aspects of the information. Accordingly, the transformer uses the attention to enhance some portions of the input data while diminishing other portions. The transformer determines which portions of the input data to enhance and which portions of the input data to diminish based on the context of each portion. For instance, the transformer may be trained to identify the context of each portion using any suitable technique, such as gradient descent.

In an example embodiment, the transformer-based neural network generates a relevance model (e.g., to determine relevance of entity name representations) by utilizing information, such as AI prompts (e.g., the first AI prompt 736), natural language prompts associated with those AI prompts (e.g., the natural language prompt 734), entity name representations (e.g., the entity name representations 740), relationships between any of the foregoing, and AI-based confidences that are derived therefrom.

In example embodiments, the first AI prompt 736 includes training logic, and the AI model 714 includes inference logic. The training logic is configured to train an AI algorithm that the inference logic uses to determine (e.g., infer) the AI-based confidences. For instance, the training logic may provide sample AI prompts, sample natural language prompts, and sample entity name representations as inputs to the AI algorithm to train the AI algorithm. The sample data may be labeled. The AI algorithm may be configured to derive relationships between the features (e.g., the first AI prompt 736, the natural language prompt 734, and the entity name representations 740) and the resulting AI-based confidences. The inference logic is configured to utilize the AI algorithm, which is trained by the training logic, to determine the AI-based confidence when the features are provided as inputs to the algorithm.

In an example embodiment, the first AI prompt is contextualized around segment definitions derived from the entities in the database. In accordance with this aspect, the resulting context emphasizes the attributes within the entities, which may ensure that the AI model is primed to understand the intricate nature of the segments being defined.

In another example embodiment, causing the AI model to determine the first subset of the entity name representations at step 214 includes instructing the AI model to return entities that exist in the database. In an aspect, entities that are capable of answering the natural language prompt are prioritized. In this manner, the AI model may be guided to handle non-sensical and tricky questions effectively.

At step 216, a response to the first AI prompt is received from the AI model. The response indicates that the first subset of the entity name representations is relevant to the natural language prompt and that the second subset of the entity name representations is not relevant to the natural language prompt. In an aspect, the response is a result of the AI model processing the first AI prompt in context of the natural language prompt and the entity name representations. In an example implementation, the second AI prompting logic 716 receives a response 742 to the first AI prompt 736 from the AI model 714. The response 742 indicates that the first subset 750 of the entity name representations 740 is relevant to the natural language prompt 734 and that the second subset of the entity name representations 740 is not relevant to the natural language prompt 734.

In an example embodiment, the response is validated to ensure that the suggested entities exist in the database. In accordance with this embodiment, validation of the response may further include addressing potential error(s) regarding the determination of the first subset of the entity name representations by the AI model.

At step 218, a second AI prompt that requests conversion of the natural language prompt to a system-specific segment definition that conforms to a system-specific segment definition format that is specific to a customer data platform system is generated. In an example implementation, the second AI prompting logic 716 generates a second AI prompt 746 that requests conversion of the natural language prompt 734 to a system-specific segment definition 762 that conforms to the system-specific segment definition format that is specific to the customer data platform system.

At step 220, the AI model is caused to convert the natural language prompt to the system-specific segment definition by providing the second AI prompt together with second contextual information as second inputs to the AI model. The second contextual information includes the natural language prompt, information regarding (e.g., indicating or describing) the system-specific segment definition format, and the first subset of the entity name representations. The second contextual information does not include the second subset of the entity name representations. The natural language prompt, the information regarding the system-specific segment definition format, and the first subset of the entity name representations include context regarding the second AI prompt. The AI model may be caused to convert the natural language prompt to the system-specific segment definition based at least on receipt of the response to the first AI prompt from the AI model. In an aspect, causing the AI model to convert the natural language prompt to the system-specific segment definition at step 220 includes causing the AI model to configure the system-specific segment definition to satisfy the natural language prompt in light of the first subset of the entity name representations.

In an example embodiment, the system-specific segment definition is a result of the AI model processing the second AI prompt in context of the natural language prompt, the information regarding the system-specific segment definition format, and the first subset of the entity name representations. In another example embodiment, the second contextual information further includes an indication of relationships between entities that are included in a subset of the entities that corresponds to the first subset of the entity name representations. In yet another example embodiment, the second contextual information does not include content of the entities. In still another example embodiment, the second contextual information does not indicate relationships between the entities.

In an example implementation, the second AI prompting logic 716 causes the AI model 714 to convert the natural language prompt 734 to the system-specific segment definition 762 by providing the second AI prompt 746 together with second contextual information 748 as second inputs to the AI model 714. The second contextual information 748 includes the natural language prompt 734, definition format information 744 (i.e., information regarding the system-specific segment definition format), and the first subset 750 of the entity name representations 740. The second contextual information 748 does not include the second subset of the entity name representations 740. The natural language prompt 734, the definition format information 744, and the first subset 750 of the entity name representations 740 include context regarding the second AI prompt 746. In an aspect, the system-specific segment definition is a customized structured query language (SQL) format, a customized JavaScript object notation (JSON) format, or a customized extensible markup language (XML) format.

One example of a system-specific segment definition format is as follows:

```
{
  “name” : “segment name”,
  “type”   : “Dynamic”
  "definition: {
    Gender: should be male
    Age: 25 to 50
  }
}
```

In an example embodiment, step 204 includes one or more of the steps shown in flowchart 300 of FIG. 3. As shown in FIG. 3, the method of flowchart 300 begins at step 302. In step 302, quantitative relevance scores associated with the respective entity names are generated by using a multi-layer perceptron (MLP) to compare, for each entity, quantitative dimensions of the entity to the respective entity name. Each of the quantitative relevance scores represents an extent to which the respective entity name corresponds to the quantitative dimensions of the respective entity. In an aspect, weights are applied to the quantitative dimensions for each entity. In accordance with this aspect, the weights that are applied to the quantitative dimensions for each entity may be based on importance of each of the quantitative dimensions. In another aspect, the MLP includes input, hidden, and output layers. The hidden layers may utilize a rectified linear unit (ReLU) activation function. A ReLU activation function is an activation function that introduces non-linearity to a deep learning model. For instance, the ReLU may mitigate (e.g., eliminate, prevent, or resolve) a vanishing gradients issue in the deep learning model. In the MLP, dropout techniques may mitigate overfitting, and hyperparameters (e.g., learning rate and neuron count) may be optimized.

A quantitative dimension is a dimension that is expressible as a quantity. For instance, the quantitative dimension may be a number (e.g., a statistic). Examples of a quantitative dimension include entity data, a schema, an attribute name, an attribute datatype, a relationship context, an attribute value trend, a historical significance, and access frequency. Entity data includes historical data and transactional data. Historical data is data that indicates one or more activities associated with a user. Transactional data indicates actions that are performed with regard to content of an entity. Examples of entity data include a data trend, a frequency of updates to the content, and importance of the entity in business operations. A schema indicates a structure of content in an entity. For instance, the schema may include primary keys, foreign keys, and inter-entity relationships. An attribute name is a name of an attribute of the entity. The attribute name may indicate a naming convention, a semantic essence of the attribute, and a frequency with which the attribute is accessed or queried. An attribute datatype indicates a datatype of an attribute. Examples of a datatype include an integer and a string. The attribute datatype may indicate a business relevance of the attribute. A relationship context indicates a significance of an entity considering relationships of the entity with other entities. For instance, the relationship context may indicate a significance of entities with which the entity has relationships. An attribute value trend indicates a pattern of values of an attribute. A historical significance indicates a significance (e.g., a change of the significance) of an entity or an attribute thereof over time. An access frequency is a frequency at which an entity is accessed. The access frequency may include real-time operation metrics regarding the entity.

In an example implementation, the scoring logic 720 generates quantitative relevance scores 754 associated with the respective entity names by using the MLP to compare, for each entity, quantitative dimensions of the entity to the respective entity name. Each of the quantitative relevance scores 754 represents an extent to which the respective entity name corresponds to the quantitative dimensions of the respective entity.

At step 304, semantic relevance scores associated with the respective entity names are generated by using a second AI model to compare a semantic context of each entity name to the respective entity name. Each semantic relevance score represents an extent to which the respective semantic context corresponds to the respective entity name. The second AI model and the AI model that is caused to determine the first subset of the entity name representations at step 214 shown in FIG. 2 may be the same or different. A semantic context of an entity name indicates a meaning of the entity name. For example, the semantic context may attribute meaning(s) to word(s) that are included in the entity name. In accordance with this example, the semantic context of the entity name may be derived from the meaning(s) attributed to the word(s) that are included in the entity name. In an aspect, weights are applied to the respective semantic relevance scores. In accordance with this aspect, the weight that is applied to each semantic relevance score indicates an importance of the semantic score (e.g., with reference to the quantitative relevance score associated with the respective entity name). In an example implementation, the scoring logic 720 generates semantic relevance scores 756 associated with the respective entity names by using the second AI model 728 to compare a semantic context of each entity name to the respective entity name. Each of the semantic relevance scores 756 represents an extent to which the respective semantic context corresponds to the respective entity name.

In an example embodiment, the second AI model 728 is a large language model (LLM). A large language model is an artificial neural network that is capable of performing natural language processing (NLP) tasks. For instance, the large language model may use a transformer model to perform the NLP tasks. In an aspect, the large language model is trained (e.g., pre-trained) using self-supervised learning and semi-supervised learning. Examples of a large language model include but are not limited to the GPT-3 and GPT-4 models, developed and distributed by OpenAI, Inc.; the LLaMA model, developed and distributed by Meta Platforms Inc.; and the PaLM model, developed and distributed by Google LLC.

At step 306, the quantitative relevance scores associated with the respective entity names and the semantic relevance scores associated with the respective entity names are combined to provide the respective relevance scores that are to be assigned to the respective entity names. In an aspect, each relevance score is a weighted combination of the quantitative relevance score associated with the respective entity name and the semantic relevance score associated with the respective entity name. For instance, each relevance score may be represented as Relevance score=(w1×Dimension1)+(w2×Dimension2)+ . . . +(wN×DimentionN)+(wS×SemanticRelevanceScore), wherein each of Dimension1, Dimension2, etc. represents a quantitative dimension of the entity, and SemanticRelevanceScore represents the semantic relevance score of the entity. In accordance with this aspect, the MLP and the second AI model are continually retrained, and the weights (i.e., w1-wN and wS) are adjusted periodically. In another aspect, min-max scaling is applied to the quantitative relevance scores and the semantic relevance scores to provide the respective relevance scores. Each relevance score may be categorized as "highly relevant", "moderately relevant", or "low relevance". For instance, the categories may correspond to respective relevance thresholds. In an example implementation, the combining logic 726 combines the quantitative relevance scores 754 associated with the respective entity names and the semantic relevance scores 756 associated with the respective entity names to provide the respective relevance scores 768 that are to be assigned to the respective entity names.

In another example embodiment, step 208 includes one or more of the steps shown in flowchart 400 of FIG. 4. As shown in FIG. 4, the method of flowchart 400 begins at step 402. In step 402, a composite dimension vector is generated for the respective entity using a dimension analyzer based at least on a weighted average of quantitative dimensions of the respective entity. A dimension analyzer analyzes relationships between quantities (e.g., the weighted averages of the respective quantitative dimensions of each entity in this example). In an example implementation, the defining logic 722 generates a composite dimension vector 758 for the respective entity using a dimension analyzer 730 based at least on a weighted average of the quantitative dimensions of the respective entity.

At step 404, a long short-term memory (LSTM) network is caused to generate the respective entity name representation by providing the composite dimension vector for the respective entity as an input to the LSTM network. A LSTM network is a recurrent neural network (RNN) model that is configured to mitigate (e.g., eliminate, prevent, or resolve) a vanishing gradient issue of the RNN. In an aspect, the LSTM network is trained on Word2Vec embeddings. Weights for the dimensions represented in a composite dimension vector may be based on domain knowledge or be learned dynamically. For instance, an entity with a high frequency of access and a low historical significance may be weighted more towards its access frequency when formulating its virtual name. The intrinsic ability of the LSTM to remember and prioritize sequential data may ensure that the most significant attributes and dimensions of an entity form the core of the entity name representation of the entity. Accordingly, the entity name representations may be contextually rich, semantically charged, and easily navigable, which may enable a user to intuitively understand and interact with the entities. In an example implementation, the defining logic 722 causes the LSTM network 732 to generate the respective entity name representation by providing the composite dimension vector for the respective entity as an input to the LSTM network 732.

In some example embodiments, one or more steps 202, 204, 206, 208, 210, 212, 214, 216, 218, and/or 220 of flowchart 200 may not be performed. Moreover, steps in addition to or in lieu of steps 202, 204, 206, 208, 210, 212, 214, 216, 218, and/or 220 may be performed. For instance, in an example embodiment, the method of flowchart 200 further includes one or more of the steps shown in flowchart 500 of FIG. 5. As shown in FIG. 5, the method of flowchart 500 begins at step 502. In step 502, a mapping that cross-references (e.g., maps) each entity name that is assigned a relevance score that is less than the relevance threshold to the replacement name that replaces the entity name is generated. In an example implementation, the defining logic 722 generates a mapping 752 that cross-references each entity name that is assigned a relevance score that is less than the relevance threshold to the replacement name that replaces the entity name.

At step 504, each replacement name that is included in the system-specific segment definition is replaced with the corresponding entity name that the replacement name replaced by using the mapping to cross-reference the replacement name to the corresponding entity name. In an example implementation, the action logic 718 replaces each replacement name that is included in the system-specific segment definition 762 with the corresponding entity name that the replacement name replaced by using the mapping 752 to cross-reference the replacement name to the corresponding entity name.

At step 506, based at least on each replacement name that is included in the system-specific segment definition being replaced with the corresponding entity name, the system-specific segment definition is executed against the database. In an example implementation, based at least on each replacement name that is included in the system-specific segment definition 762 being replaced with the corresponding entity name, the action logic 718 executes the system-specific segment definition 762 against the database 710.

In another example embodiment, the method of flowchart 200 further includes one or more of the steps shown in flowchart 600 of FIG. 6. As shown in FIG. 6, the method of flowchart 600 begins at step 602. In step 602, a second response to the second AI prompt is received from the AI model. The second response includes the system-specific segment definition. In an example implementation, the action logic 718 receives, from the AI model 714, a second response to the second AI prompt 746. The second response includes the system-specific segment definition 762.

At step 604, an action is performed using the system-specific segment definition that is received from the AI model. In an example implementation, the action logic 718 performs the action using the system-specific segment definition 762 that is received from the AI model 714.

In an aspect of this embodiment, performing the action at step 604 includes causing the database to provide the data that satisfies the criterion by executing the system-specific segment definition against the database. For instance, executing the system-specific segment definition against the database may include causing the database to analyze a subset of the entities that corresponds to the first subset of the entity name representations (e.g., and not a second subset of the entities that corresponds to the second subset of the entity name representations). In an example implementation, the action logic 718 causes the database 710 to provide data 770 that satisfies the criterion by executing the system-specific segment definition 762 against the database 710.

In another aspect of this embodiment, performing the action at step 604 includes providing an update inquiry to an entity that initiated the natural language prompt. The update inquiry requests whether a change is to be made to the system-specific segment definition. For example, the change may be narrowing a scope of the system-specific segment definition (e.g., by adding an attribute to the system-specific segment definition). In an example implementation, the action logic 718 provides an update inquiry 764 to an entity that initiated the natural language prompt 734. The update inquiry 764 requests whether a change is to be made to the system-specific segment definition 762.

In an example of this aspect, the method of flowchart 600 further includes making the change to the system-specific segment definition based at least on receipt of an instruction, which indicates that the change is to be made. In an example implementation, the action logic 718 makes the change to the system-specific segment definition 762.

It will be recognized that the computing system 700 may not include one or more of the AI-based entity-reducing and renaming logic 708, the database 710, the first AI prompting logic 712, the AI model 714, the second AI prompting logic 716, the action logic 718, the scoring logic 720, the defining logic 722, the multi-layer perceptron 724, the combining logic 726, the second AI model 728, the dimensional analyzer 730, and/or the LSTM network 732. Furthermore, the computing system 700 may include components in addition to or in lieu of the AI-based entity-reducing and renaming logic 708, the database 710, the first AI prompting logic 712, the AI model 714, the second AI prompting logic 716, the action logic 718, the scoring logic 720, the defining logic 722, the multi-layer perceptron 724, the combining logic 726, the second AI model 728, the dimensional analyzer 730, and/or the LSTM network 732.

Although the operations of some of the disclosed methods are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods may be used in conjunction with other methods.

Any one or more of the AI-based entity-reducing and renaming logic 108, the AI-based entity-reducing and renaming logic 708, the database 710, the first AI prompting logic 712, the AI model 714, the second AI prompting logic 716, the action logic 718, the scoring logic 720, the defining logic 722, the multi-layer perceptron 724, the combining logic 726, the second AI model 728, the dimensional analyzer 730, the LSTM network 732, flowchart 200, flowchart 300, flowchart 400, flowchart 500, and/or flowchart 600 may be implemented in hardware, software, firmware, or any combination thereof.

For example, any one or more of the AI-based entity-reducing and renaming logic 108, the AI-based entity-reducing and renaming logic 708, the database 710, the first AI prompting logic 712, the AI model 714, the second AI prompting logic 716, the action logic 718, the scoring logic 720, the defining logic 722, the multi-layer perceptron 724, the combining logic 726, the second AI model 728, the dimensional analyzer 730, the LSTM network 732, flowchart 200, flowchart 300, flowchart 400, flowchart 500, and/or flowchart 600 may be implemented, at least in part, as computer program code configured to be executed in one or more processors.

In another example, any one or more of the AI-based entity-reducing and renaming logic 108, the AI-based entity-reducing and renaming logic 708, the database 710, the first AI prompting logic 712, the AI model 714, the second AI prompting logic 716, the action logic 718, the scoring logic 720, the defining logic 722, the multi-layer perceptron 724, the combining logic 726, the second AI model 728, the dimensional analyzer 730, the LSTM network 732, flowchart 200, flowchart 300, flowchart 400, flowchart 500, and/or flowchart 600 may be implemented, at least in part, as hardware logic/electrical circuitry. Such hardware logic/electrical circuitry may include one or more hardware logic components. Examples of a hardware logic component include but are not limited to a field-programmable gate array (FPGA), an application-specific integrated circuit (ASIC), an application-specific standard product (ASSP), a system-on-a-chip system (SoC), a complex programmable logic device (CPLD), etc. For instance, a SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 8:
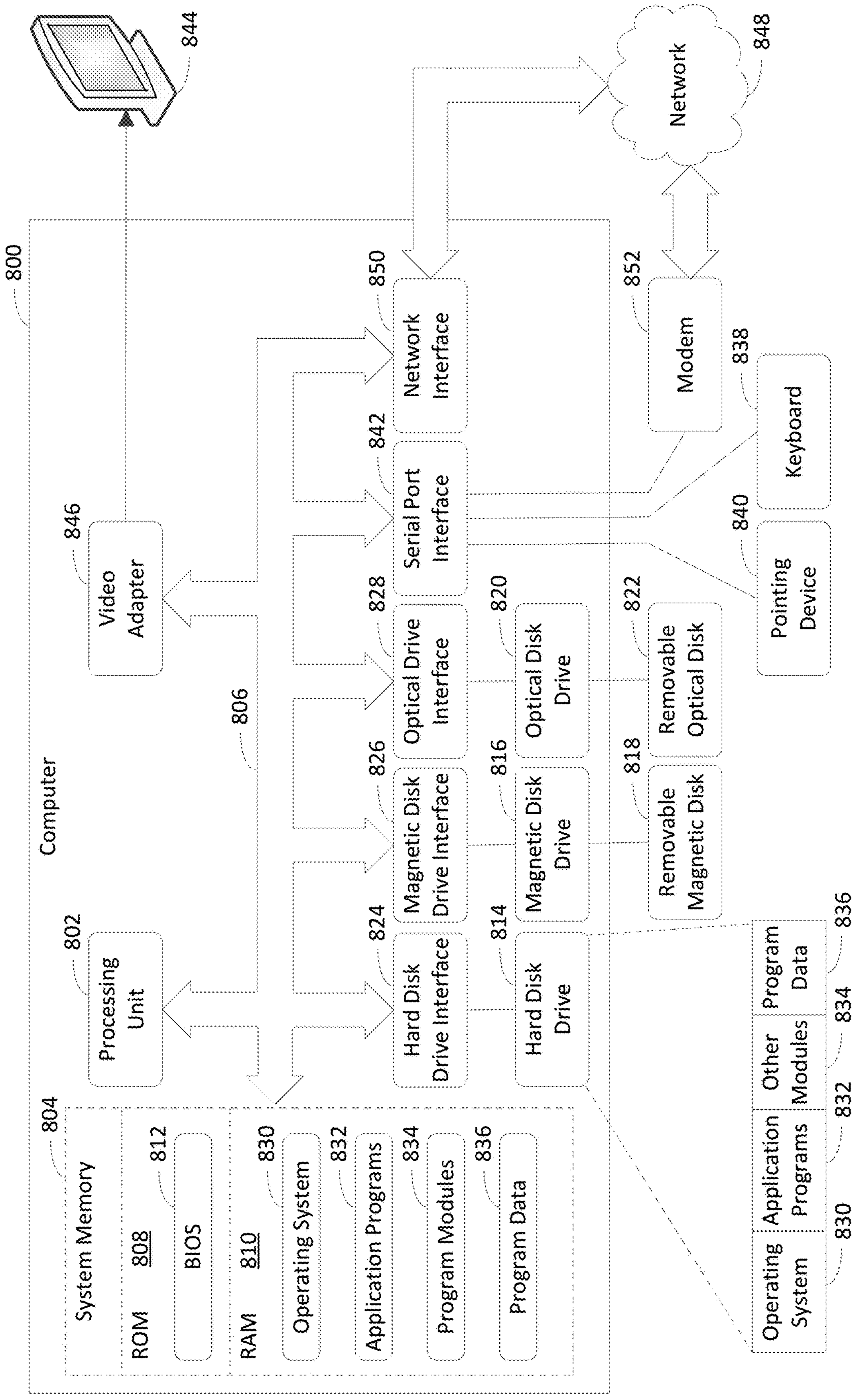
FIG. 8 depicts an example computer in which embodiments may be implemented.

II. Further Discussion of Some Example Embodiments (A1) An example system (FIG. 1, 102A-102M, 106A-106N; FIG. 7, 700; FIG. 8, 800) comprises a processor system (FIG. 8, 802) and a memory (FIG. 8, 804, 808, 810) that stores computer-executable instructions. The computer-executable instructions are executable by the processor system to receive (FIG. 2, 202) a natural language prompt (FIG. 7, 734), which requests data that satisfies a search criterion from a database (FIG. 7, 710) that stores entities (FIG. 7, 760). The computer-executable instructions are executable by the processor system further to assign (FIG. 2, 204) relevance scores (FIG. 7, 768) to entity names of the entities, each relevance score indicating an extent to which a respective entity name corresponds to content of a respective entity. The computer-executable instructions are executable by the processor system further to define (FIG. 2, 206) entity name representations (FIG. 7, 740) to represent the entities by performing the following: for each entity having an entity name that is assigned a relevance score that is less than a relevance threshold, define (FIG. 2, 208) the entity name representation of the respective entity to be a respective replacement name, which is based at least on the content of the respective entity, rather than the entity name of the respective entity; and for each entity having an entity name that is assigned a relevance score that is greater than or equal to the relevance threshold, define (FIG. 2, 210) the entity name representation of the respective entity to be the respective entity name. The computer-executable instructions are executable by the processor system further to generate (FIG. 2, 212) a first AI prompt (FIG. 7, 736) that requests an indication of which of the entity name representations is relevant to the natural language prompt. The computer-executable instructions are executable by the processor system further to cause (FIG. 2, 214) an AI model (FIG. 7, 714) to determine a first subset (FIG. 7, 750) of the entity name representations that is relevant to the natural language prompt and a second subset of the entity name representations that is not relevant to the natural language prompt by providing the first AI prompt together with first contextual information (FIG. 7, 738) as first inputs to the AI model, the first contextual information including the natural language prompt and the entity name representations, wherein the natural language prompt and the entity name representations include context regarding the first AI prompt. The computer-executable instructions are executable by the processor system further to generate (FIG. 2, 218) a second AI prompt (FIG. 7, 746) that requests conversion of the natural language prompt to a system-specific segment definition (FIG. 7, 762) that conforms to a system-specific segment definition format that is specific to a customer data platform system. The computer-executable instructions are executable by the processor system further to based at least on receipt of a response (FIG. 7, 741) to the first AI prompt from the AI model that indicates the first and second subsets of the entity name representations, cause (FIG. 2, 220) the AI model to convert the natural language prompt to the system-specific segment definition by providing the second AI prompt together with second contextual information (FIG. 7, 748) as second inputs to the AI model, the second contextual information including the natural language prompt and information (FIG. 7, 744) regarding the system-specific segment definition format and the first subset of the entity name representations and not including the second subset of the entity name representations, wherein the natural language prompt, the information regarding the system-specific segment definition format, and the first subset of the entity name representations include context regarding the second AI prompt.

(A2) In the example system of A1, wherein the entities include tables.

(A3) In the example system of any of A1-A2, wherein the entities include columns, which are included in tables.

(A4) In the example system of any of A1-A3, wherein the second contextual information further comprises an indication of relationships between entities that are included in a subset of the entities that corresponds to the first subset of the entity name representations.

(A5) In the example system of any of A1-A4, wherein the computer-executable instructions are executable by the processor system to assign the relevance scores to the entity names by performing the following: generate quantitative relevance scores associated with the respective entity names by using a multi-layer perceptron (MLP) to compare, for each entity, quantitative dimensions of the entity to the respective entity name, each of the quantitative relevance scores representing an extent to which the respective entity name corresponds to the quantitative dimensions of the respective entity; generate semantic relevance scores associated with the respective entity names by using a second AI model to compare a semantic context of each entity name to the respective entity name, each semantic relevance score representing an extent to which the respective semantic context corresponds to the respective entity name; and combine the quantitative relevance scores associated with the respective entity names and the semantic relevance scores associated with the respective entity names to provide the respective relevance scores that are to be assigned to the respective entity names.

(A6) In the example system of any of A1-A5, wherein the computer-executable instructions are executable by the processor system to define the entity name representation of each entity having an entity name that is assigned a relevance score that is less than the relevance threshold by performing the following: generate a composite dimension vector for the respective entity using a dimension analyzer based at least on a weighted average of quantitative dimensions of the respective entity; and cause a long short-term memory (LSTM) network to generate the respective entity name representation by providing the composite dimension vector for the respective entity as an input to the LSTM network.

(A7) In the example system of any of A1-A6, wherein the computer-executable instructions are executable by the processor system further to: generate a mapping that cross-references each entity name that is assigned a relevance score that is less than the relevance threshold to the replacement name that replaces the entity name.

(A8) In the example system of any of A1-A7, wherein the computer-executable instructions are executable by the processor system further to: replace each replacement name that is included in the system-specific segment definition with the corresponding entity name that the replacement name replaced by using the mapping to cross-reference the replacement name to the corresponding entity name; and based at least on each replacement name that is included in the system-specific segment definition being replaced with the corresponding entity name, execute the system-specific segment definition against the database.

(A9) In the example system of any of A1-A8, wherein the computer-executable instructions are executable by the processor system further to: receive, from the AI model, a second response to the second AI prompt, the second response including the system-specific segment definition; and perform an action using the system-specific segment definition that is received from the AI model.

(A10) In the example system of any of A1-A9, wherein the computer-executable instructions are executable by the processor system to: cause the database to provide the data that satisfies the criterion by executing the system-specific segment definition against the database.

(A11) In the example system of any of A1-A10, wherein the computer-executable instructions are executable by the processor system to: provide an update inquiry to an entity that initiated the natural language prompt, the update inquiry requesting whether a change is to be made to the system-specific segment definition.

(B1) An example method is implemented by a computing system (FIG. 1, 102A-102M, 106A-106N; FIG. 7, 700; FIG. 8, 800). The method comprises receiving (FIG. 2, 202) a natural language prompt (FIG. 7, 734), which requests data that satisfies a search criterion from a database (FIG. 7, 710) that stores entities (FIG. 7, 760). The method further comprises assigning (FIG. 2, 204) relevance scores (FIG. 7, 768) to entity names of the entities, each relevance score indicating an extent to which a respective entity name corresponds to content of a respective entity. The method further comprises defining (FIG. 2, 206) entity name representations (FIG. 7, 740) to represent the entities by performing the following: for each entity having an entity name that is assigned a relevance score that is less than a relevance threshold, defining (FIG. 2, 208) the entity name representation of the respective entity to be a respective replacement name, which is based at least on the content of the respective entity, rather than the entity name of the respective entity; and for each entity having an entity name that is assigned a relevance score that is greater than or equal to the relevance threshold, defining (FIG. 2, 210) the entity name representation of the respective entity to be the respective entity name. The method further comprises generating (FIG. 2, 212) a first AI prompt (FIG. 7, 736) that requests an indication of which of the entity name representations is relevant to the natural language prompt. The method further comprises causing (FIG. 2, 214) an AI model (FIG. 7, 714) to determine a first subset (FIG. 7, 750) of the entity name representations that is relevant to the natural language prompt and a second subset of the entity name representations that is not relevant to the natural language prompt by providing the first AI prompt together with first contextual information (FIG. 7, 738) as first inputs to the AI model, the first contextual information including the natural language prompt and the entity name representations, wherein the natural language prompt and the entity name representations include context regarding the first AI prompt. The method further comprises generating (FIG. 2, 218) a second AI prompt (FIG. 7, 746) that requests conversion of the natural language prompt to a system-specific segment definition (FIG. 7, 762) that conforms to a system-specific segment definition format that is specific to a customer data platform system. The method further comprises based at least on receipt of a response (FIG. 7, 741) to the first AI prompt from the AI model that indicates the first and second subsets of the entity name representations, causing (FIG. 2, 220) the AI model to convert the natural language prompt to the system-specific segment definition by providing the second AI prompt together with second contextual information (FIG. 7, 748) as second inputs to the AI model, the second contextual information including the natural language prompt and information (FIG. 7, 744) regarding the system-specific segment definition format and the first subset of the entity name representations and not including the second subset of the entity name representations, wherein the natural language prompt, the information regarding the system-specific segment definition format, and the first subset of the entity name representations include context regarding the second AI prompt.

(B2) In the example method of B1, wherein the entities include tables.

(B3) In the example method of any of B1-B2, wherein the entities include columns, which are included in tables.

(B4) In the example method of any of B1-B3, wherein the second contextual information further comprises an indication of relationships between entities that are included in a subset of the entities that corresponds to the first subset of the entity name representations.

(B5) In the example method of any of B1-B4, wherein assigning the relevance scores to the entity names of the entities comprises: generating quantitative relevance scores associated with the respective entity names by using a multi-layer perceptron (MLP) to compare, for each entity, quantitative dimensions of the entity to the respective entity name, each of the quantitative relevance scores representing an extent to which the respective entity name corresponds to the quantitative dimensions of the respective entity; generating semantic relevance scores associated with the respective entity names by using a second AI model to compare a semantic context of each entity name to the respective entity name, each semantic relevance score representing an extent to which the respective semantic context corresponds to the respective entity name; and combining the quantitative relevance scores associated with the respective entity names and the semantic relevance scores associated with the respective entity names to provide the respective relevance scores that are to be assigned to the respective entity names.

(B6) In the example method of any of B1-B5, wherein, for each entity having an entity name that is assigned a relevance score that is less than a relevance threshold, defining the entity name representation of the respective entity comprises: generating a composite dimension vector for the respective entity using a dimension analyzer based at least on a weighted average of quantitative dimensions of the respective entity; and causing a long short-term memory (LSTM) network to generate the respective entity name representation by providing the composite dimension vector for the respective entity as an input to the LSTM network.

(B7) In the example method of any of B1-B6, further comprising: generating a mapping that cross-references each entity name that is assigned a relevance score that is less than the relevance threshold to the replacement name that replaces the entity name.

(B8) In the example method of any of B1-B7, further comprising: replacing each replacement name that is included in the system-specific segment definition with the corresponding entity name that the replacement name replaced by using the mapping to cross-reference the replacement name to the corresponding entity name; and based at least on each replacement name that is included in the system-specific segment definition being replaced with the corresponding entity name, executing the system-specific segment definition against the database.

(B9) In the example method of any of B1-B8, further comprising: receiving, from the AI model, a second response to the second AI prompt, the second response including the system-specific segment definition; and performing an action using the system-specific segment definition that is received from the AI model.

(B10) In the example method of any of B1-B9, wherein performing the action comprises: causing the database to provide the data that satisfies the criterion by executing the system-specific segment definition against the database.

(B11) In the example method of any of B1-B10, wherein performing the action comprises: providing an update inquiry to an entity that initiated the natural language prompt, the update inquiry requesting whether a change is to be made to the system-specific segment definition.

(C1) An example computer program product (FIG. 8, 818, 822) comprising a computer-readable storage medium having instructions recorded thereon for enabling a processor-based system (FIG. 1, 102A-102M, 106A-106N; FIG. 7, 700; FIG. 8, 800) to perform operations. The operations comprise receiving (FIG. 2, 202) a natural language prompt (FIG. 7, 734), which requests data that satisfies a search criterion from a database (FIG. 7, 710) that stores entities (FIG. 7, 760). The operations further comprise assigning (FIG. 2, 204) relevance scores (FIG. 7, 768) to entity names of the entities, each relevance score indicating an extent to which a respective entity name corresponds to content of a respective entity. The operations further comprise defining (FIG. 2, 206) entity name representations (FIG. 7, 740) to represent the entities by performing the following: for each entity having an entity name that is assigned a relevance score that is less than a relevance threshold, defining (FIG. 2, 208) the entity name representation of the respective entity to be a respective replacement name, which is based at least on the content of the respective entity, rather than the entity name of the respective entity; and for each entity having an entity name that is assigned a relevance score that is greater than or equal to the relevance threshold, defining (FIG. 2, 210) the entity name representation of the respective entity to be the respective entity name. The operations further comprise generating (FIG. 2, 212) a first AI prompt (FIG. 7, 736) that requests an indication of which of the entity name representations is relevant to the natural language prompt. The operations further comprise causing (FIG. 2, 214) an AI model (FIG. 7, 714) to determine a first subset (FIG. 7, 750) of the entity name representations that is relevant to the natural language prompt and a second subset of the entity name representations that is not relevant to the natural language prompt by providing the first AI prompt together with first contextual information (FIG. 7, 738) as first inputs to the AI model, the first contextual information including the natural language prompt and the entity name representations, wherein the natural language prompt and the entity name representations include context regarding the first AI prompt. The operations further comprise generating (FIG. 2, 218) a second AI prompt (FIG. 7, 746) that requests conversion of the natural language prompt to a system-specific segment definition (FIG. 7, 762) that conforms to a system-specific segment definition format that is specific to a customer data platform system. The operations further comprise, based at least on receipt of a response (FIG. 7, 741) to the first AI prompt from the AI model that indicates the first and second subsets of the entity name representations, causing (FIG. 2, 220) the AI model to convert the natural language prompt to the system-specific segment definition by providing the second AI prompt together with second contextual information (FIG. 7, 748) as second inputs to the AI model, the second contextual information including the natural language prompt and information (FIG. 7, 744) regarding the system-specific segment definition format and the first subset of the entity name representations and not including the second subset of the entity name representations, wherein the natural language prompt, the information regarding the system-specific segment definition format, and the first subset of the entity name representations include context regarding the second AI prompt.

III. Example Computer System

FIG. 8 depicts an example computer 800 in which embodiments may be implemented. Any one or more of the user devices 102A-102M and/or any one or more of the servers 106A-106N shown in FIG. 1 and/or the computing system 700 shown in FIG. 7 may be implemented using computer 800, including one or more features of computer 800 and/or alternative features. Computer 800 may be a general-purpose computing device in the form of a conventional personal computer, a mobile computer, or a workstation, for example, or computer 800 may be a special purpose computing device. The description of computer 800 provided herein is provided for purposes of illustration, and is not intended to be limiting. Embodiments may be implemented in further types of computer systems, as would be known to persons skilled in the relevant art(s).

As shown in FIG. 8, computer 800 includes a processing unit 802, a system memory 804, and a bus 806 that couples various system components including system memory 804 to processing unit 802. Bus 806 represents one or more of any of several types of bus structures, including a memory bus or memory controller, a peripheral bus, an accelerated graphics port, and a processor or local bus using any of a variety of bus architectures. System memory 804 includes read only memory (ROM) 808 and random access memory (RAM) 810. A basic input/output system 812 (BIOS) is stored in ROM 808.

Computer 800 also has one or more of the following drives: a hard disk drive 814 for reading from and writing to a hard disk, a magnetic disk drive 816 for reading from or writing to a removable magnetic disk 818, and an optical disk drive 820 for reading from or writing to a removable optical disk 822 such as a CD ROM, DVD ROM, or other optical media. Hard disk drive 814, magnetic disk drive 816, and optical disk drive 820 are connected to bus 806 by a hard disk drive interface 824, a magnetic disk drive interface 826, and an optical drive interface 828, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 830, one or more application programs 832, other program modules 834, and program data 836. Application programs 832 or program modules 834 may include, for example, computer program logic for implementing any one or more of (e.g., at least a portion of) the AI-based entity-reducing and renaming logic 108, the AI-based entity-reducing and renaming logic 708, the database 710, the first AI prompting logic 712, the AI model 714, the second AI prompting logic 716, the action logic 718, the scoring logic 720, the defining logic 722, the multi-layer perceptron 724, the combining logic 726, the second AI model 728, the dimensional analyzer 730, the LSTM network 732, flowchart 200 (including any step of flowchart 200), flowchart 300 (including any step of flowchart 300), flowchart 400 (including any step of flowchart 400), flowchart 500 (including any step of flowchart 500), and/or flowchart 600 (including any step of flowchart 600), as described herein.

A user may enter commands and information into the computer 800 through input devices such as keyboard 838 and pointing device 840. Other input devices (not shown) may include a microphone, joystick, game pad, satellite dish, scanner, touch screen, camera, accelerometer, gyroscope, or the like. These and other input devices are often connected to the processing unit 802 through a serial port interface 842 that is coupled to bus 806, but may be connected by other interfaces, such as a parallel port, game port, or a universal serial bus (USB).

A display device 844 (e.g., a monitor) is also connected to bus 806 via an interface, such as a video adapter 846. In addition to display device 844, computer 800 may include other peripheral output devices (not shown) such as speakers and printers.

Computer 800 is connected to a network 848 (e.g., the Internet) through a network interface or adapter 850, a modem 852, or other means for establishing communications over the network. Modem 852, which may be internal or external, is connected to bus 806 via serial port interface 842.

As used herein, the terms "computer program medium" and "computer-readable storage medium" are used to generally refer to media (e.g., non-transitory media) such as the hard disk associated with hard disk drive 814, removable magnetic disk 818, removable optical disk 822, as well as other media such as flash memory cards, digital video disks, random access memories (RAMs), read only memories (ROM), and the like. A computer-readable storage medium is not a signal, such as a carrier signal or a propagating signal. For instance, a computer-readable storage medium may not include a signal. Accordingly, a computer-readable storage medium does not constitute a signal per se. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Example embodiments are also directed to such communication media.

As noted above, computer programs and modules (including application programs 832 and other program modules 834) may be stored on the hard disk, magnetic disk, optical disk, ROM, or RAM. Such computer programs may also be received via network interface 850 or serial port interface 842. Such computer programs, when executed or loaded by an application, enable computer 800 to implement features of embodiments discussed herein. Accordingly, such computer programs represent controllers of the computer 800.

Example embodiments are also directed to computer program products comprising software (e.g., computer-readable instructions) stored on any computer-useable medium. Such software, when executed in one or more data processing devices, causes data processing device(s) to operate as described herein. Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

It will be recognized that the disclosed technologies are not limited to any particular computer or type of hardware. Certain details of suitable computers and hardware are well known and need not be set forth in detail in this disclosure.

IV. Conclusion

The foregoing detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

Descriptors such as "first", "second", "third", etc. are used to reference some elements discussed herein. Such descriptors are used to facilitate the discussion of the example embodiments and do not indicate a required order of the referenced elements, unless an affirmative statement is made herein that such an order is required.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

What is claimed is:

1. A system comprising:

a processor system; and a memory that stores computer-executable instructions that are executable by the processor system to at least:

receive a natural language prompt, which requests data that satisfies a search criterion from a database that stores entities;

assign relevance scores to entity names of the entities, each relevance score indicating an extent to which a respective entity name corresponds to content of a respective entity;

define entity name representations to represent the entities by performing the following:

for each entity having an entity name that is assigned a relevance score that is less than a relevance threshold, define the entity name representation of the respective entity to be a respective replacement name, which is generated based at least on the content of the respective entity, rather than the entity name of the respective entity; and for each entity having an entity name that is assigned a relevance score that is greater than or equal to the relevance threshold, define the entity name representation of the respective entity to be the respective entity name;

generate a first model input that includes the natural language prompt and a machine-readable representation of the entity name representations;

cause an AI model to generate an output that classifies the entity name representations among a first subset that is relevant to the natural language prompt and a second subset that is not relevant to the natural language prompt by processing the first model input;

generate a second model input, which has a reduced amount of information relative to the first model input, by excluding the second subset of the entity name representations and including the first subset of the entity name representations identified as relevant to the natural language prompt with the natural language prompt and information that specifies a system-specific segment definition format that is specific to a customer data platform system;

cause the AI model to generate a system-specific segment definition that conforms to the system-specific segment definition format by processing the second model input, the second model input including the reduced amount of information that enables the AI model to process the second model input without exceeding a limit on an amount of data that the AI model is capable of processing; and retrieve data that satisfies the search criterion by executing the system-specific segment definition against the database.

2. The system of claim 1, wherein the entities include tables.

3. The system of claim 1, wherein the entities include columns, which are included in tables.

4. The system of claim 1, wherein the computer-executable instructions are executable by the processor system to generate the second model input further by including an indication of relationships between entities that are included in a subset of the entities that corresponds to the first subset of the entity name representations.

5. The system of claim 1, wherein the computer-executable instructions are executable by the processor system to assign the relevance scores to the entity names by performing the following:

generate quantitative relevance scores associated with the respective entity names by using a multi-layer perceptron (MLP) to compare, for each entity, quantitative dimensions of the entity to the respective entity name, each of the quantitative relevance scores representing an extent to which the respective entity name corresponds to the quantitative dimensions of the respective entity;

generate semantic relevance scores associated with the respective entity names by using a second AI model to compare a semantic context of each entity name to the respective entity name, each semantic relevance score representing an extent to which the respective semantic context corresponds to the respective entity name; and combine the quantitative relevance scores associated with the respective entity names and the semantic relevance scores associated with the respective entity names to provide the respective relevance scores that are to be assigned to the respective entity names.

6. The system of claim 1, wherein the computer-executable instructions are executable by the processor system to define the entity name representation of each entity having an entity name that is assigned a relevance score that is less than the relevance threshold by performing the following:

generate a composite dimension vector for the respective entity using a dimension analyzer based at least on a weighted average of quantitative dimensions of the respective entity; and cause a long short-term memory (LSTM) network to generate the respective entity name representation by providing the composite dimension vector for the respective entity as an input to the LSTM network.

7. The system of claim 1, wherein the computer-executable instructions are executable by the processor system further to:

generate a mapping that cross-references each entity name that is assigned a relevance score that is less than the relevance threshold to the replacement name that replaces the entity name.

8. The system of claim 7, wherein the computer-executable instructions are executable by the processor system further to:

replace each replacement name that is included in the system-specific segment definition with the corresponding entity name that the replacement name replaced by using the mapping to cross-reference the replacement name to the corresponding entity name; and based at least on each replacement name that is included in the system-specific segment definition being replaced with the corresponding entity name, execute the system-specific segment definition against the database.

9. The system of claim 1, wherein the computer-executable instructions are executable by the processor system to:

provide an update inquiry to an entity that initiated the natural language prompt, the update inquiry requesting whether a change is to be made to the system-specific segment definition.

10. A method implemented by a computing system, the method comprising:

receiving a natural language prompt, which requests data that satisfies a search criterion from a database that stores entities;

assigning relevance scores to entity names of the entities, each relevance score indicating an extent to which a respective entity name corresponds to content of a respective entity;

defining entity name representations to represent the entities by performing the following:

for each entity having an entity name that is assigned a relevance score that is less than a relevance threshold, defining the entity name representation of the respective entity to be a respective replacement name, which is generated based at least on the content of the respective entity, rather than the entity name of the respective entity; and for each entity having an entity name that is assigned a relevance score that is greater than or equal to the relevance threshold, defining the entity name representation of the respective entity to be the respective entity name;

generating a first model input that includes the natural language prompt and a machine-readable representation of the entity name representations;

causing an AI model to generate an output that classifies the entity name representations among a first subset that is relevant to the natural language prompt and a second subset that is not relevant to the natural language prompt by processing the first model input;

generating a second model input, which has a reduced amount of information relative to the first model input, by excluding the second subset of the entity name representations and including the first subset of the entity name representations identified as relevant to the natural language prompt with the natural language prompt and information that specifies a system-specific segment definition format that is specific to a customer data platform system;

causing the AI model to generate a system-specific segment definition that conforms to the system-specific segment definition format by processing the second model input, the second model input including the reduced amount of information that enables the AI model to process the second model input without exceeding a limit on an amount of data that the AI model is capable of processing; and retrieving data that satisfies the search criterion by executing the system-specific segment definition against the database.

11. The method of claim 10, wherein the second model input is generated further by including an indication of relationships between entities that are included in a subset of the entities that corresponds to the first subset of the entity name representations.

12. The method of claim 10, wherein assigning the relevance scores to the entity names of the entities comprises:

generating quantitative relevance scores associated with the respective entity names by using a multi-layer perceptron (MLP) to compare, for each entity, quantitative dimensions of the entity to the respective entity name, each of the quantitative relevance scores representing an extent to which the respective entity name corresponds to the quantitative dimensions of the respective entity;

generating semantic relevance scores associated with the respective entity names by using a second AI model to compare a semantic context of each entity name to the respective entity name, each semantic relevance score representing an extent to which the respective semantic context corresponds to the respective entity name; and combining the quantitative relevance scores associated with the respective entity names and the semantic relevance scores associated with the respective entity names to provide the respective relevance scores that are to be assigned to the respective entity names.

13. The method of claim 10, wherein, for each entity having an entity name that is assigned a relevance score that is less than a relevance threshold, defining the entity name representation of the respective entity comprises:

generating a composite dimension vector for the respective entity using a dimension analyzer based at least on a weighted average of quantitative dimensions of the respective entity; and causing a long short-term memory (LSTM) network to generate the respective entity name representation by providing the composite dimension vector for the respective entity as an input to the LSTM network.

14. The method of claim 10, further comprising:

generating a mapping that cross-references each entity name that is assigned a relevance score that is less than the relevance threshold to the replacement name that replaces the entity name.

15. The method of claim 14, further comprising:

replacing each replacement name that is included in the system-specific segment definition with the corresponding entity name that the replacement name replaced by using the mapping to cross-reference the replacement name to the corresponding entity name; and based at least on each replacement name that is included in the system-specific segment definition being replaced with the corresponding entity name, executing the system-specific segment definition against the database.

16. A computer program product comprising a computer-readable storage medium having instructions recorded thereon for enabling a processor-based system to perform operations, the operations comprising:

receiving a natural language prompt, which requests data that satisfies a search criterion from a database that stores entities;

assigning relevance scores to entity names of the entities, each relevance score indicating an extent to which a respective entity name corresponds to content of a respective entity;

defining entity name representations to represent the entities by performing the following:

for each entity having an entity name that is assigned a relevance score that is less than a relevance threshold, defining the entity name representation of the respective entity to be a respective replacement name, which is based at least on the content of the respective entity, rather than the entity name of the respective entity; and for each entity having an entity name that is assigned a relevance score that is greater than or equal to the relevance threshold, defining the entity name representation of the respective entity to be the respective entity name;

generating a first model input that includes the natural language prompt and a machine-readable representation of the entity name representations;

causing an AI model to generate an output that classifies the entity name representations among a first subset that is relevant to the natural language prompt and a second subset that is not relevant to the natural language prompt by processing the first model input;

generating a second model input, which has a reduced amount of information relative to the first model input, by excluding the second subset of the entity name representations and including the first subset of the entity name representations identified as relevant to the natural language prompt with the natural language prompt and information that specifies a system-specific segment definition format that is specific to a customer data platform system;

causing the AI model to generate a system-specific segment definition that conforms to the system-specific segment definition format by processing the second model input, the second model input including the reduced amount of information that enables the AI model to process the second model input without exceeding a limit on an amount of data that the AI model is capable of processing; and retrieving data that satisfies the search criterion by executing the system-specific segment definition against the database.

17. The computer program product of claim 16, wherein the second model input is generated further by including an indication of relationships between entities that are included in a subset of the entities that corresponds to the first subset of the entity name representations.

18. The computer program product of claim 16, wherein assigning the relevance scores to the entity names of the entities comprises:

generating quantitative relevance scores associated with the respective entity names by using a multi-layer perceptron (MLP) to compare, for each entity, quantitative dimensions of the entity to the respective entity name, each of the quantitative relevance scores representing an extent to which the respective entity name corresponds to the quantitative dimensions of the respective entity;

generating semantic relevance scores associated with the respective entity names by using a second AI model to compare a semantic context of each entity name to the respective entity name, each semantic relevance score representing an extent to which the respective semantic context corresponds to the respective entity name; and combining the quantitative relevance scores associated with the respective entity names and the semantic relevance scores associated with the respective entity names to provide the respective relevance scores that are to be assigned to the respective entity names.

19. The computer program product of claim 16, wherein, for each entity having an entity name that is assigned a relevance score that is less than a relevance threshold, defining the entity name representation of the respective entity comprises:

generating a composite dimension vector for the respective entity using a dimension analyzer based at least on a weighted average of quantitative dimensions of the respective entity; and causing a long short-term memory (LSTM) network to generate the respective entity name representation by providing the composite dimension vector for the respective entity as an input to the LSTM network.

20. The computer program product of claim 16, wherein the operations further comprise:

generating a mapping that cross-references each entity name that is assigned a relevance score that is less than the relevance threshold to the replacement name that replaces the entity name;

replacing each replacement name that is included in the system-specific segment definition with the corresponding entity name that the replacement name replaced by using the mapping to cross-reference the replacement name to the corresponding entity name;

and based at least on each replacement name that is included in the system-specific segment definition being replaced with the corresponding entity name, executing the system-specific segment definition against the database.

* * * * *